(12) United States Patent
Kisono

(10) Patent No.: US 6,614,548 B1
(45) Date of Patent: Sep. 2, 2003

(54) APPARATUS AND METHOD OF PERFORMING A FACSIMILE TRANSMISSION THROUGH LOCAL AREA NETWORK

(75) Inventor: Masahiro Kisono, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/175,251

(22) Filed: Oct. 20, 1998

(30) Foreign Application Priority Data

Oct. 20, 1997 (JP) .............................. 9-303363

(51) Int. Cl.$^7$ ................................. H04N 1/32
(52) U.S. Cl. ...................... 358/1.15; 358/468; 358/442; 358/434; 358/402
(58) Field of Search ................. 358/1.15, 409, 358/442, 468, 434, 402; 709/200–237

(56) References Cited

U.S. PATENT DOCUMENTS

| | | | | |
|---|---|---|---|---|
| 5,410,416 A | * | 4/1995 | Amberg et al. | 358/405 |
| 5,521,719 A | * | 5/1996 | Yamada | 358/438 |
| 5,552,901 A | * | 9/1996 | Kikuchi et al. | 358/468 |
| 5,828,468 A | * | 10/1998 | Lee et al. | 358/434 |
| 5,946,386 A | * | 8/1999 | Rogers et al. | 379/265 |
| 5,995,240 A | * | 11/1999 | Sato | 358/407 |
| 6,097,797 A | * | 8/2000 | Oseto | 379/100.08 |
| 6,173,043 B1 | * | 1/2001 | Finnigan | 379/88.18 |
| 6,219,714 B1 | * | 4/2001 | Inhwan et al. | 709/238 |

* cited by examiner

Primary Examiner—Thomas D. Lee
(74) Attorney, Agent, or Firm—Cooper & Dunham LLP

(57) ABSTRACT

A data terminal which is coupled to a local area network includes a first facsimile communications device and a second communications device. The first communications device performs a standard facsimile communications operation with respect to an information transfer request to a different data terminal through the local area network in order to transfer facsimile image information via the different data terminal to an arbitrary facsimile machine which is connected to a public switched telephone network. The different data terminal is coupled to the local area network and the public switched telephone network. The second facsimile communications device performs the standard facsimile communications operation with the first communications device and receives information, including a telephone number of the arbitrary facsimile machine, image information to be transferred, property information of the image information, and identification information of the data terminal. The second communications device then performs the standard facsimile communications operation using the information received from the first communications device with a different data terminal through the local area network after completing the standard facsimile communications operation with the first communications device. The second communications device is operatively connected to the first facsimile communications device and the different data terminal via the local area network.

47 Claims, 26 Drawing Sheets

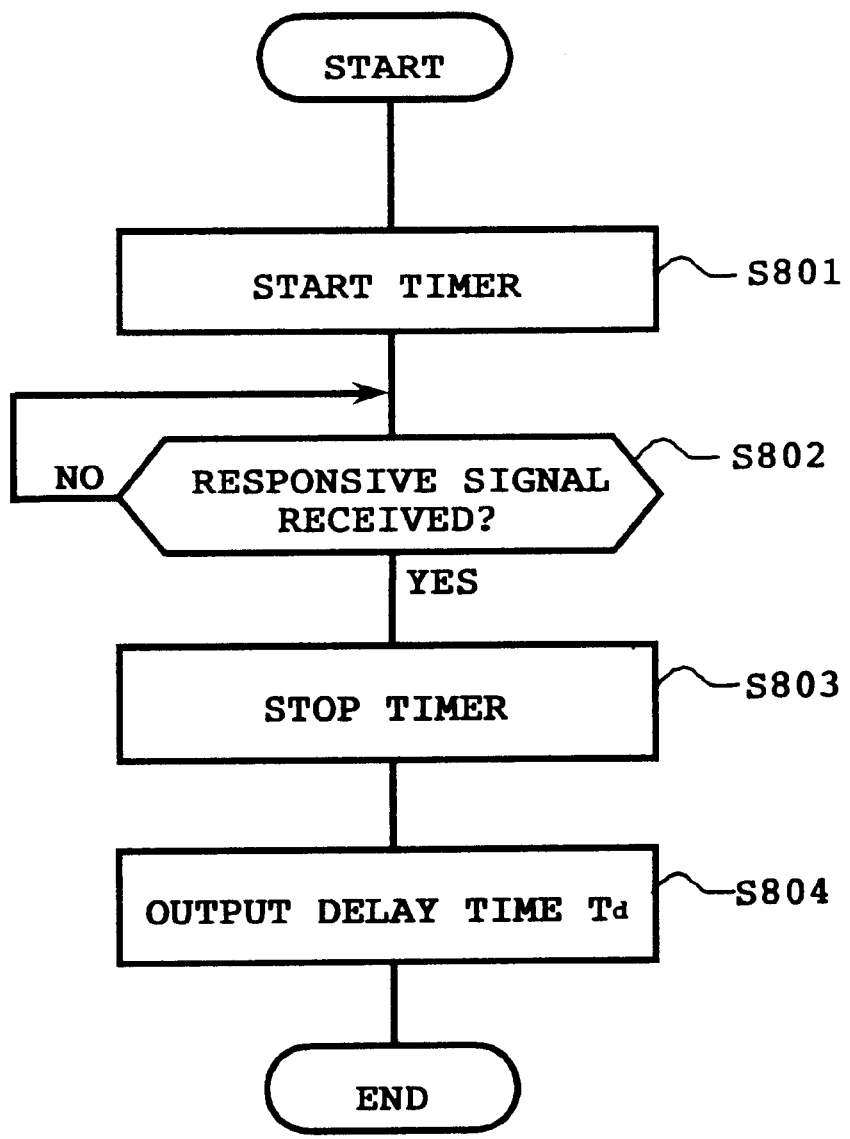

APPARATUS AND METHOD OF PERFORMING A FACSIMILE TRANSMISSION THROUGH LOCAL AREA NETWORK

BACKGROUND

1. Field

The disclosed system and method relate to a data terminal apparatus, and more particularly to a data terminal apparatus which is capable of performing a facsimile transmission operation through a local area network avoiding a communications error due to a delay time.

2. Description of the Related Art

There has been developed a data terminal apparatus which is capable of transmitting facsimile image information to a facsimile machine which is connected to a public switched telephone network (PSTN), via a so-called network facsimile machine. The network facsimile machine is capable of exchanging information such as electronic mail with other data terminals via a local area network and the Internet, as well as exchanging facsimile data with other facsimile machines via the PSTN.

One way for transferring facsimile image information from a data terminal to an arbitrary facsimile machine which is connected to the PSTN is to send an information transfer request to the network facsimile machine using the electronic mail. However, the electronic mail may be inferior in an aspect of immediacy of transmitting information since the local area network normally employs a mail server system in which the electronic mail is transferred to another data terminal, including the network facsimile-machine, via a mail server.

If a facsimile application which is included in the data terminal apparatus is configured to activate and to use a facsimile modem of the network facsimile machine as if using a facsimile modem of the data terminal apparatus, the immediacy of transmitting information may be greatly increased. In this case, the facsimile application software of the data terminal apparatus carries out the communications operation with the network facsimile machine through the local area network. Accordingly, delay times between commands in accordance with the Group 3 facsimile communications procedure and responsive signals corresponding to the commands may be unstable due to a varying amount of local area network traffic. A delay time that exceeds a predetermined allowable time period may cause an error of the facsimile application software.

However, these systems do not allow users to perform a facsimile transmission operation from a data terminal apparatus to a network facsimile machine via a local area network with an increased immediacy of transmitting information and without causing a communications error.

SUMMARY

The present application provides a data terminal that can be coupled to a local area network. In one embodiment, the data terminal includes a first facsimile communications device and a second communications device. The first communications device performs a standard facsimile communications operation with respect to an information transfer request to a different data terminal through the local area network in order to transfer facsimile image information via the different data terminal to an arbitrary facsimile machine which is connected to a public switched telephone network. The different data terminal is coupled to the local area network and the public switched telephone network. The second facsimile communications device performs the standard facsimile communications operation with the first communications device and receives information, including a telephone number of the arbitrary facsimile machine, image information to be transferred, property information of the image information, and identification information of the data terminal. The second communications device then performs the standard facsimile communications operation using the information received from the first communications device with a different data terminal through the local area network after completing the standard facsimile communications operation with the first communications device. The second communications device is operatively connected to the first facsimile communications device and the different data terminal via the local area network.

The second communications device may control the standard facsimile communications operation with the first communications device to perform throughout a plurality of facsimile communications steps which are defined as phases A through to E in accordance with a Group 3 facsimile communications procedure.

The second communications device may set a redirect mode to perform at least one of the plurality of phases A through to E of the standard facsimile communications operation directly between the first communications device and the different data terminal.

The second communications device may set the redirect mode to perform the phase C of the standard facsimile communications operation directly between the first communications device and the different data terminal.

The second communications device may measure a delay time in the communications with the different data terminal by sending a test command to the different data terminal. Then, the second communications device may determine if the delay time is smaller than a predetermined value. Further, the second communications device may perform the standard facsimile communications operation under the redirect mode between the first communications device and the different data terminal when the delay time is smaller than the predetermined value, and perform the standard facsimile communications operation first with the first communications device and then with the different data terminal when the delay time is greater than the predetermined value.

The second communications device may set the redirect mode before the standard facsimile communications operation and measures the delay time with relative to a plurality of modem commands which are sent from the first communications device to the different data terminal.

The present application also provides an electronic communications system that is capable of transmitting facsimile information from a data terminal to at least one facsimile machine. In one embodiment, the system includes a plurality of data terminals, and a plurality of different data terminals, a plurality of facsimile machines. Each of the plurality of data terminals is coupled to a local area network. Each of the plurality of different data terminals is coupled to the local area network and to a public switched telephone network. Each of the plurality of facsimile machines is coupled to the public switched telephone network. Each of the plurality of data terminals includes a first facsimile communications device and a second communications device. The first facsimile communications device performs a standard facsimile communications operation with respect to an information transfer request to one of the different data terminals through the local area network in order to transfer facsimile image information via the aforementioned one of the different data terminals to at least one of the facsimile machines. The second facsimile communications device performs the standard facsimile communications operation with the first communications device and receives information. The information includes a telephone number of the aforementioned one of the facsimile machines, image information to be transferred, property information of the image information, and identification information of the one of the data terminals. The second facsimile communications device further performs the standard facsimile communications operation using the information received from the first communications device with the aforementioned one of the different data terminals through the local area network after completing the standard facsimile communications operation with the first communications device. The second communications device is operatively connected to the first facsimile communications device and the plurality of different data terminals via the local area network.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 20 is a flowchart of an exemplary operation of a delay time measurement by the third central processing unit of FIG. 16;

DETAILED DESCRIPTION

Figure 1:
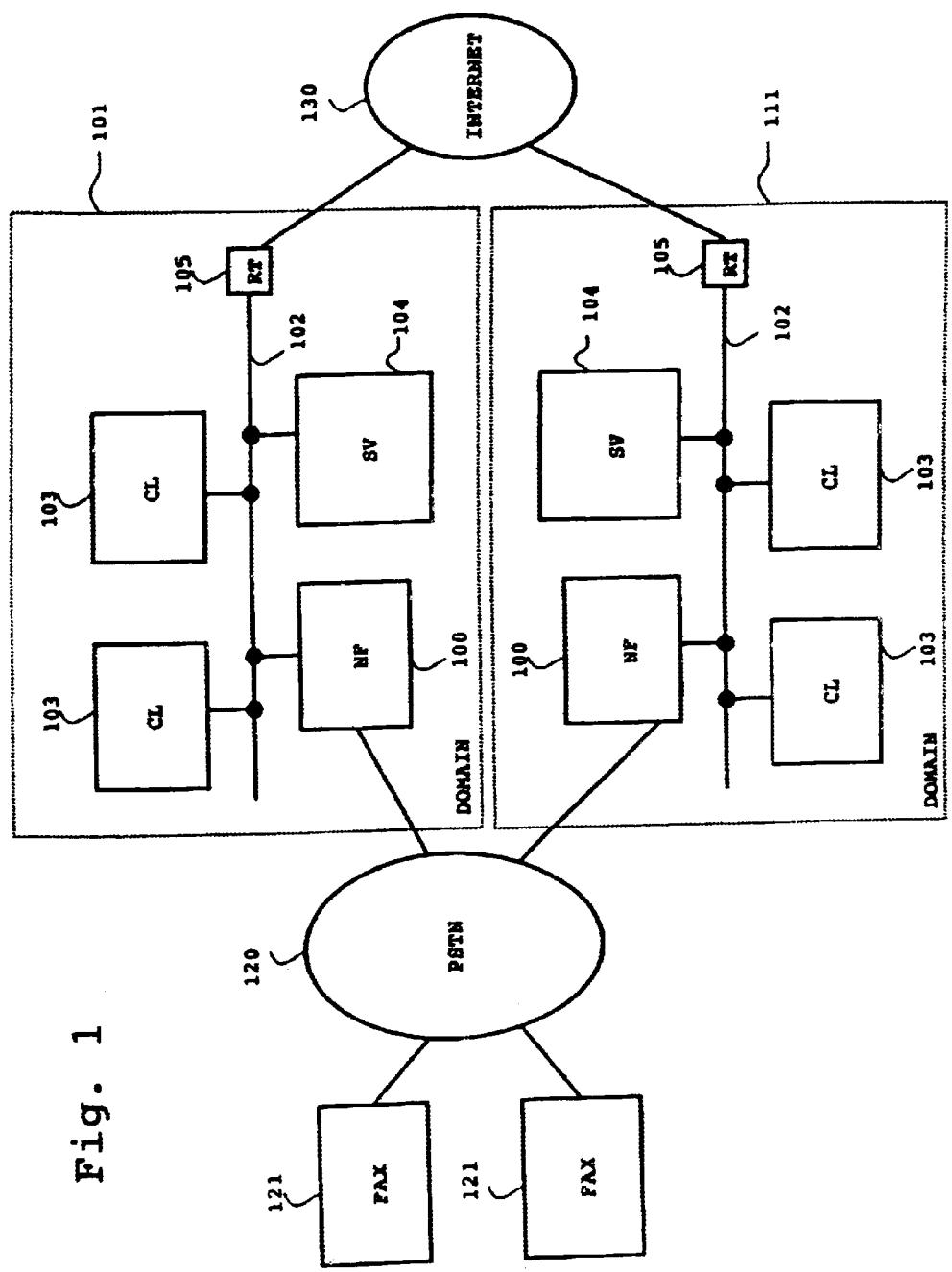
FIG. 1 is a block diagram of an electronic communications system including a network facsimile apparatus according to an embodiment of the present invention.

In describing preferred embodiments of the present invention illustrated in the drawings, specific terminology is employed. However, the application is not intended to be limited to the specific terminology so selected and it is to be understood that each specific element includes all technical equivalents which operate in a similar manner.

Referring now to the drawings, wherein like reference numerals designate identical or corresponding parts throughout the several views, FIG. 1 illustrates an exemplary electronic communications system including an exemplary network facsimile apparatus (NF) 100. The electronic communications system of FIG. 1 includes various types of electronic communications networks such as a domain (DM) 101, a domain (DM) 111, a public switched telephone network (PSTN) 120, the Internet 130, and possibly other networks which are not specifically illustrated.

The DM 101 includes a local area network (LAN) 102 that connects various devices, including the above-mentioned network facsimile apparatus 100, a plurality of client terminals (CL) 103, a mail server (SV) 104, and a router (RT) 105, and that allows communications between the various devices. The DM 111 is similarly configured to that of the DM 101 for the sake of simplicity. The PSTN 120 connects a plurality of communications terminals including Group 3 facsimile machines (FAX) 121 and 122 to allow communications between these terminals. The Internet 130 connects a plurality of domains (DMs), including the DMs 101 and 111, and allows communications between the domains.

In each of the DMs 101 and 111, the network facsimile apparatus 100 is connected to the LAN 102 and the PSTN 120 to function as a gateway to both networks. The RT 105 is connected to the LAN 102 and the Internet 130 to function as another gateway to these networks. With these connections, each of the LANs 102 has a connection to the plurality of communications terminals including the FAXs 121 and 122 through the PSTN 120 and to the plurality of domains through the Internet 130. Preferably, each of the FAXs 121 and 122 transmits and receives image information through a Group 3 facsimile communications procedure.

Each of the DMs 101 and 111 has an individual domain identification. Each of the DMs 101 and 111, the network facsimile apparatus 100, each of the CLs 103, and the SV 104 is given an individual network address, usually based on its individual address information coupled with the corresponding domain identification. A user who uses a client terminal in the DM 101 is provided with an individual user address which is usually based on the user's individual name coupled with the above-mentioned individual network address of the client terminal. Such an individual user address that is generally made of alphanumeric symbols including alphabetical characters is referred to as an electronic mail (E-mail) address. Using these network addresses and E-mail addresses, communications are carried out between terminals including the CLs 103 and the network facsimile apparatus 100 within a domain and between domains through the Internet 130.

The network facsimile apparatus 100 has various functions related to electronic mail (E-mail), including an E-mail function for sending and receiving E-mail containing image information to and from other terminal machines through the LAN 102. The network facsimile apparatus 100 also has general facsimile functions including a Group 3 facsimile communications capability for transmitting and receiving facsimile image information to and from destination facsimile machines through the PSTN 120. Furthermore, the network facsimile apparatus 100 has a server function for providing services in connection with a modem function thereof to the CLs 103 connected to the LAN 102

Generally, a so-called protocol suite is applied for communications between machines connected to local area networks and via the Internet. In an operation of the protocol suite, a communication protocol, such as TCP/IP (transmission control protocol/Internet protocol) and another communication protocol are used in combination for up to a transport layer of an OSI (open systems interconnection), and for the layers higher than the transport layer, respectively. For example, an SMTP (simple mail transfer protocol) is used as a higher layer protocol for communications such as E-mail.

In each of the DMs 101 and 111, the LAN 102 employs a mail server system in which an incoming E-mail is first stored in the SV 104 and then sent to a destination client terminal. More specifically, when E-mail information reaches a domain, for example DM 101, the file server 104 checks a destination mail address attached to the E-mail and if the destination mail address is for a client terminal of that domain the mail server system of the domain stores the E-mail into the SV 104. When the E-mail has a destination mail address other than one controlled by the domain, the mail server system of the domain transmits the E-mail to the Internet 130 via the RT 105 and the E-mail is sent to another domain, e.g. the DM 111, to seek the destination terminal machine, or to a host machine that has an address corresponding to the destination mail address attached to the E-mail, through a data transmission function of the Internet 130.

In the above-described server system, at a certain interval the network facsimile apparatus 100 and the CLs 103 in each domain, e.g., DMs 101 and 111, request the SV 104 to check if an incoming E-mail addressed for a user of the requesting machine is stored therein. If an E-mail addressed to the user of the requesting machine is stored in the SV 104, the mail server system transmits the E-mail to the requesting machine. Upon receiving the E-mail, the requesting machine indicates to the user that there is an incoming E-mail. In the example being described, the network facsimile apparatus 100 has an E-mail address to exchange E-mails as described above. The protocol is a POP(post office protocol), for example, to be applied for, the communications from the CLs 103 and the network facsimile apparatus 100 to the SV 104 to request the incoming check as described above.

In the example being described, each of the CLs 103 has various application software programs including programs that are usually used by one or more individual users on an exclusive basis. One exemplary program performs the Group 3 facsimile communications procedure to communicate with the network facsimile apparatus 100, for example, through the LAN 102. Another exemplary program exchanges various data such as E-mail with other terminals through the LAN 102. A further exemplary program processes facsimile image information included in E-mail that is sent from the network facsimile 100. That is, when a user sees an indication of an E-mail arrival, the user may open the E-mail to check the contents. If the contents include binary data such as facsimile image information, the user can initiate a program that can handle the binary data in an appropriate manner so as to see the contents. Typically to review the binary data in E-mail, the data is first transferred into a different data format such as a MIME (multi-purpose Internet mail extensions).

The above-mentioned communication protocols, such as the TCP/IP, SMTP, and POP, as well as the data format and structure of the E-mail, including the MIME, are defined in an RFC (request for comments) published by an IETF (Internet engineering task force). For example, the TCP and IP are defined in an RFC793, the SMTP in an RFC821, and the data format and structure of the E-mail in an RFC822, RFC1521, RFC1522, and RFC1468.

Next, an exemplary structure of the network facsimile apparatus 100 is explained with reference to FIG. 2. The network facsimile apparatus 100 includes a system controller 1, a system memory 2, a parameter memory 3, a clock circuit 4, a scanner 5, a printer 6, a display panel unit 7, an encoding/decoding unit 8, an, image memory 9, a Group 3 facsimile modem 10, a network controller 11, a LAN (local area network) interface 12, a LAN (local area network) data transmission controller 13, and an internal bus 14.

The system controller 1 controls the operations of the network facsimile apparatus 100, including facsimile data transmission controls for transmitting and receiving image information and arbitrary data files. The system controller 1 includes a communications controller 1a, explained later. The system memory 2 stores control (or application) programs to be executed by the system controller 1 and corresponding data used when executing the control programs. In addition, the system memory 2 includes a working memory area reserved for use by the system controller 1. The parameter memory 3 stores various kinds of parameters and information specific to the network facsimile apparatus 100. The clock circuit 4 generates information of the present time.

The scanner 5 reads an image of a document at one of predetermined image reading resolutions. The printer 6 produces an image output at one of predetermined print resolutions. The display panel unit 7 includes various kinds of operational keys and indicators interfacing between an operator and the network facsimile apparatus 100.

The encoding/decoding unit 8 encodes image information to be transmitted to other facsimile terminals so that the information is compressed. The encoding/decoding unit 8 also decodes the compressed image information, which are transmitted from other facsimile terminals, back into original image information. The transmission data memory 9 stores a plurality of files of data including image data that are compressed and binary data.

The Group 3 facsimile modem 10 is preferably a Group 3 facsimile modem that performs the functions of a modem for the Group 3 facsimile machine. The facsimile modem 10 includes a low-speed modem function, such as a V.21 modem, for transmitting and receiving communication protocols and a high-speed modem function, such as V.17, V.34, V.29, V.27ter modems, for mainly transmitting and receiving image information. The network controller 11 has direct connections to the Group 3 facsimile modem 10. The network controller 11 includes an automatic transmitting and receiving function and controls the connection of the network facsimile apparatus 100 to the PSTN 120.

The LAN interface 12 is a communication interface between the LAN data transmission controller 13 and the LAN 102 which is located in the same domain as the network facsimile apparatus 100. The LAN data transmission controller 13 controls communications, using a plurality of predetermined protocol suites, for exchanging various kinds of data with other devices associated with the same domain as the network facsimile apparatus 100, e.g., DM 101, via the LAN 102. The controller 13 can also control communications for exchanging various kinds of data with data terminal machines associated with other domains via the Internet 130.

Figure 2:
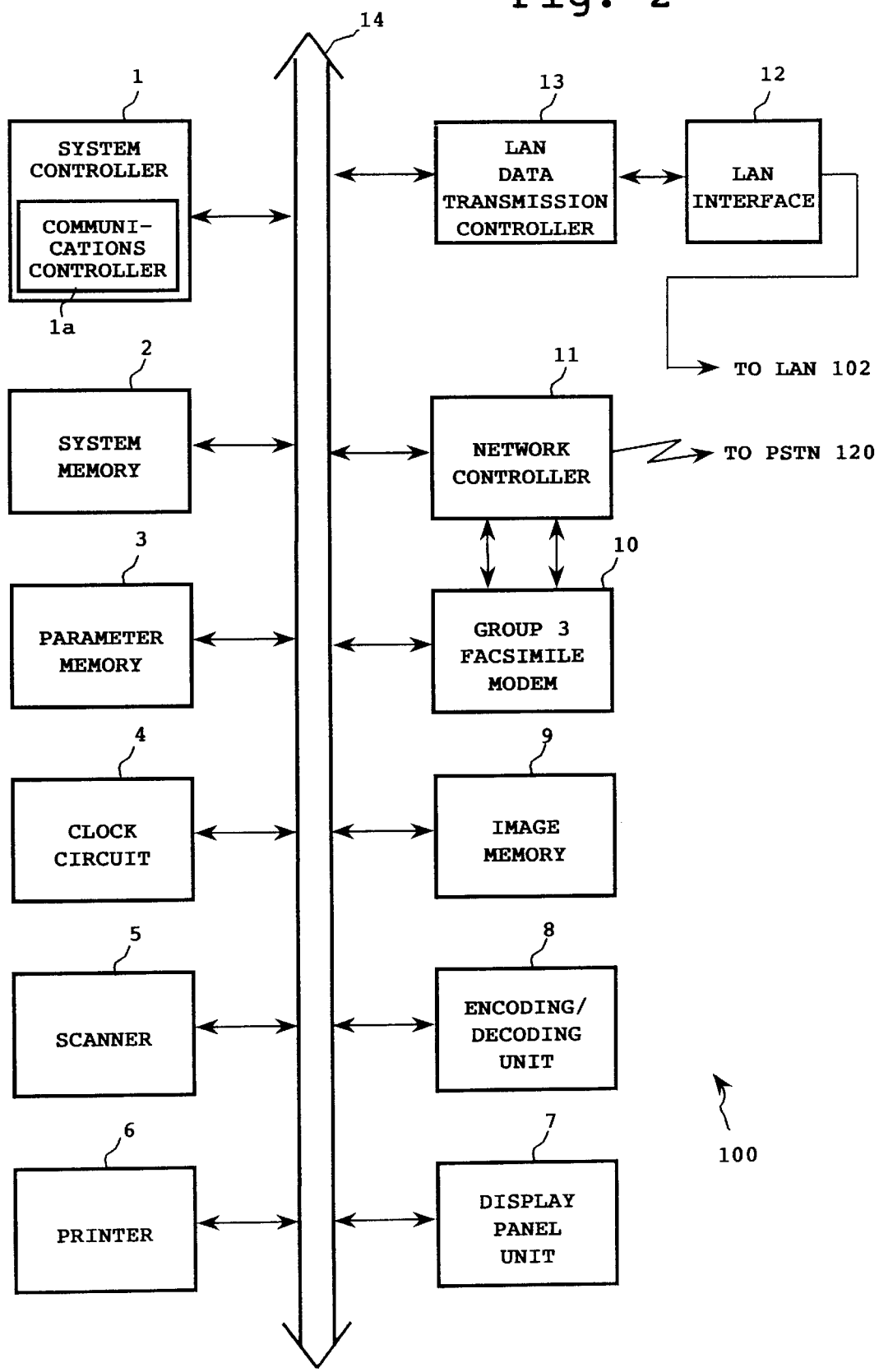
FIG. 2 is a block diagram of the network facsimile apparatus included in the electronic communications system of FIG. 1.

The above-described units of the network facsimile apparatus 100 are connected commonly to the internal bus 14, directly or indirectly, as shown in FIG. 2, so as to communicate with each other.

Figure 3:
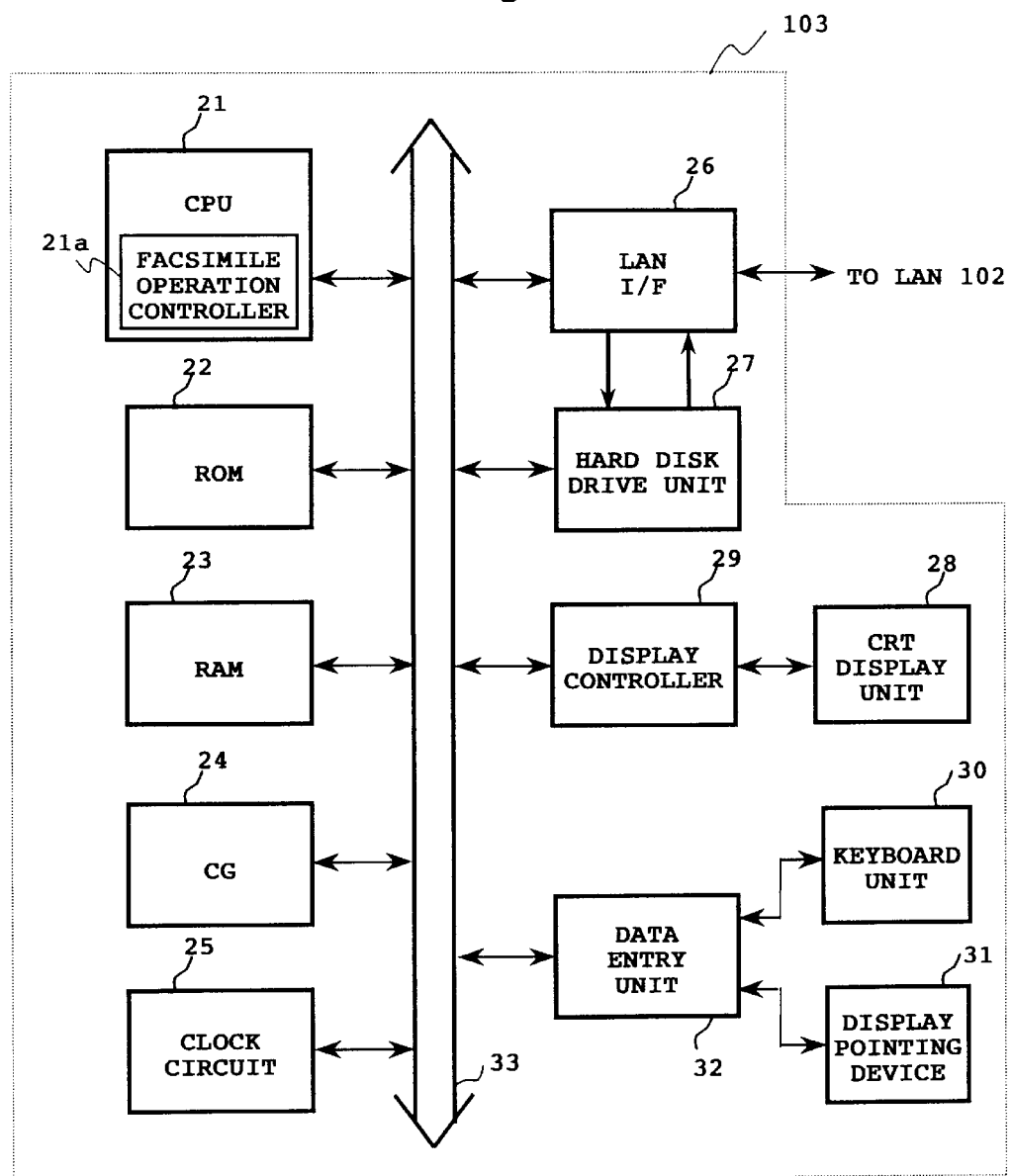
FIG. 3 is a block diagram of the client terminal apparatus included in the electronic communications system of FIG. 1.

Next, an exemplary system configuration of the CLs 103 is explained with reference to FIG. 3. As illustrated in FIG. 3, each of the CLs 103 includes a CPU (central processing unit) 21, a ROM (read only memory) 22, a RAM (random access memory) 23, a character generator (CG) 24, a clock circuit 25, a LAN (local area network) interface 26, a hard disk drive unit 27, a CRT (cathode lay tube) display unit 28, a display controller 29, a keyboard unit 30, a screen pointing device 31, a data entry controller 32, and an internal bus 33.

The CPU 21 controls the operations of the CL 103, and includes a facsimile application controller 21a (explained later). The ROM (read only memory) 22 stores control programs to be executed by the CPU 21 and corresponding data used when executing the control programs. The RAM (random access memory) 23 includes a working memory area reserved for use of the CPU 21. The CG 24 generates data for displaying each character. The clock circuit 25 generates information of the present time. The LAN interface 26 connects the CL 103 to the LAN 102. The hard disk drive 27 stores various application programs including a facsimile application. The hard disk drive 27 also includes various kinds of data including work data, file data, image data, and so forth. The CRT display unit 28 displays a screen with which a user operates the CL 103. The display controller 29 is connected to the CRT display unit 28 and controls the screen contents thereof.

The keyboard unit 30 enters various instructions and data to the CPU 21 of the CL 103 in accordance with the operations thereon by the user. The screen pointing device 31 manipulates a pointer on-screen in order to select a specific location on the screen, for example, in accordance with the user instruction. The data entry controller 32 is connected to the keyboard unit 30 and the screen pointing device 31 to control data entries performed by the user via these data entry devices.

The above-described units of the CL 103 are connected commonly to the internal bus 33, directly or indirectly, as shown in FIG. 3, so as to communicate with each other.

Figure 4:
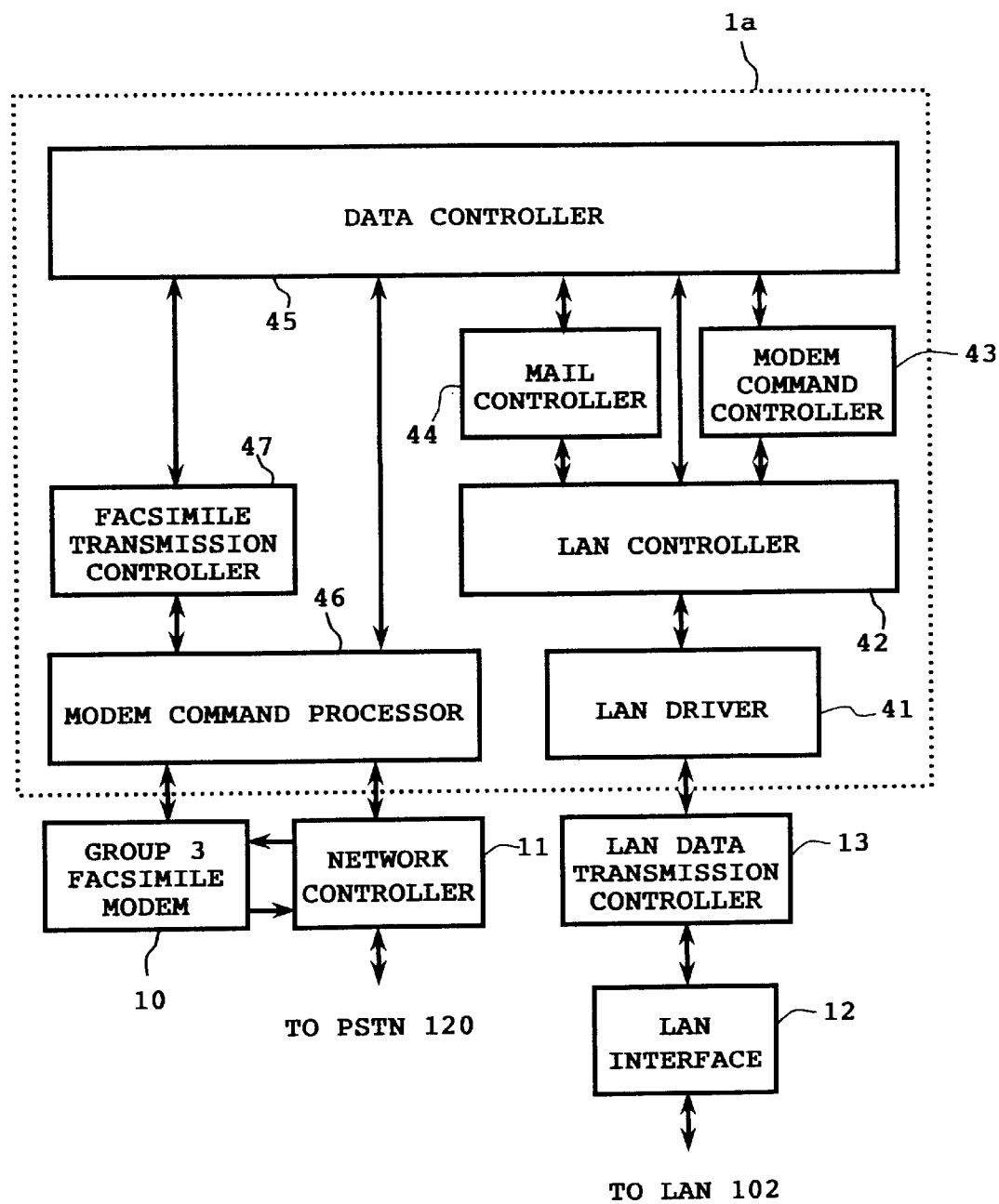
FIG. 4 is a block diagram of a main part of a system controller included in the network facsimile apparatus of FIG. 2.

Next, an exemplary configuration of the communications controller 1a included in the system controller 1 of the network facsimile apparatus 100 is explained with reference to FIG. 4. The network facsimile apparatus 100 executes communications operations, including operations of facsimile communications and electronic mail, under the control of the communications controller 1a of the system controller 1. As shown in FIG. 4, the communications controller 1a of the system controller 1 includes a LAN (local area network) driver 41, a LAN (local area network) controller 42, a modem command controller 43, a mail controller 44, a data controller 45, a modem command processor 46, and a facsimile communications controller 47.

The LAN driver 41 transmits and receives various kinds of data, including modem commands and electronic mail, to and from the LAN data transmission controller 13 and the LAN controller 42. The LAN controller 42 transmits and receives the data of modem commands to and from the modem command controller 43, and of electronic mail to and from the mail controller. Also, the LAN controller 42 transmits and receives data other than the data of modem commands and electronic mail to and from the data controller 45. The modem command controller 43 accepts the modem commands conforming to EIA (electric industries association)-592 (class 2) and generates a set of modem control information that corresponds to such modem commands. The modem command controller 43 transmits and receives these modem commands to and from the modem command processor 46 via the data controller 45.

During the electronic mail transfer process, the mail controller 44 executes the data processing relative to the protocols for lower communications layers and the data controller 45 executes that for higher communications layers. The facsimile communications controller 47 controls facsimile communications control operations including a Group 3 facsimile communications operation. The modem command processor 46 controls the Group 3 facsimile modem 10 and the network controller 11.

Figure 5:
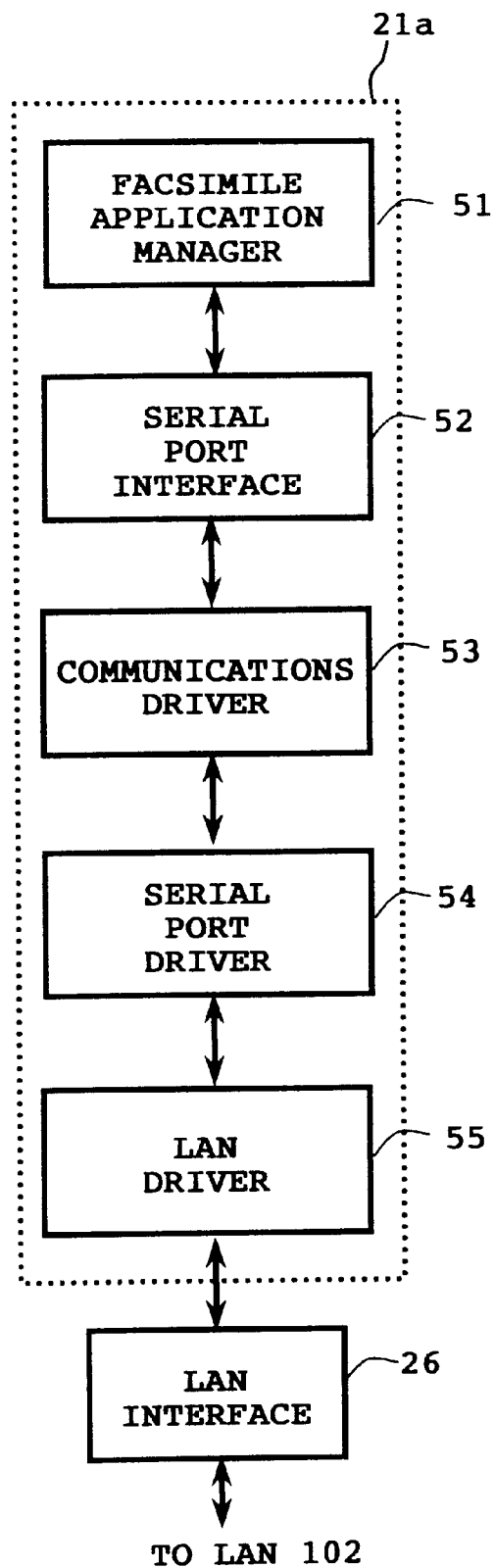
FIG. 5 is a block diagram of a main part of a first exemplary central processing unit included in the client terminal apparatus of FIG. 3.

Next, a first embodiment of the facsimile application controller is explained with reference to FIGS. 5–8. The facsimile application controller 21a is the first embodiment and an exemplary configuration thereof is illustrated in FIG. 5. The facsimile application controller 21a controls the facsimile application when the CL 103 performs a facsimile communications operation with data terminals such as the network facsimile apparatus 100 having the communications capabilities of the facsimile and the LAN. As shown in FIG. 5, such a facsimile application controller 21a includes a facsimile application manager 51, a serial port interface 52, a communications driver 53, a serial port driver 54, and a LAN (local area network) driver 55.

The facsimile application manager 51 executes the facsimile application in accordance with the facsimile application program resident in the hard disk drive 27. The serial port interface 52 is provided between the facsimile application manager 51 and the communications driver 53, and provides thereto a serial port for sending and receiving serial facsimile data. The communications driver 53 sends and receives various kinds of serial data to and from the serial port interface 52. The serial port driver 54 is provided between the communications driver 53 and the LAN driver 55, and has an important roll in the serial data transmission operation. For example, the serial port driver 54 executes facsimile modem functions with respect to the serial facsimile data which are transmitted between the communications driver 53 and the LAN driver 55. The LAN driver 55 is connected to the LAN interface 26 to exchange the serial facsimile data therewith.

Figure 6:
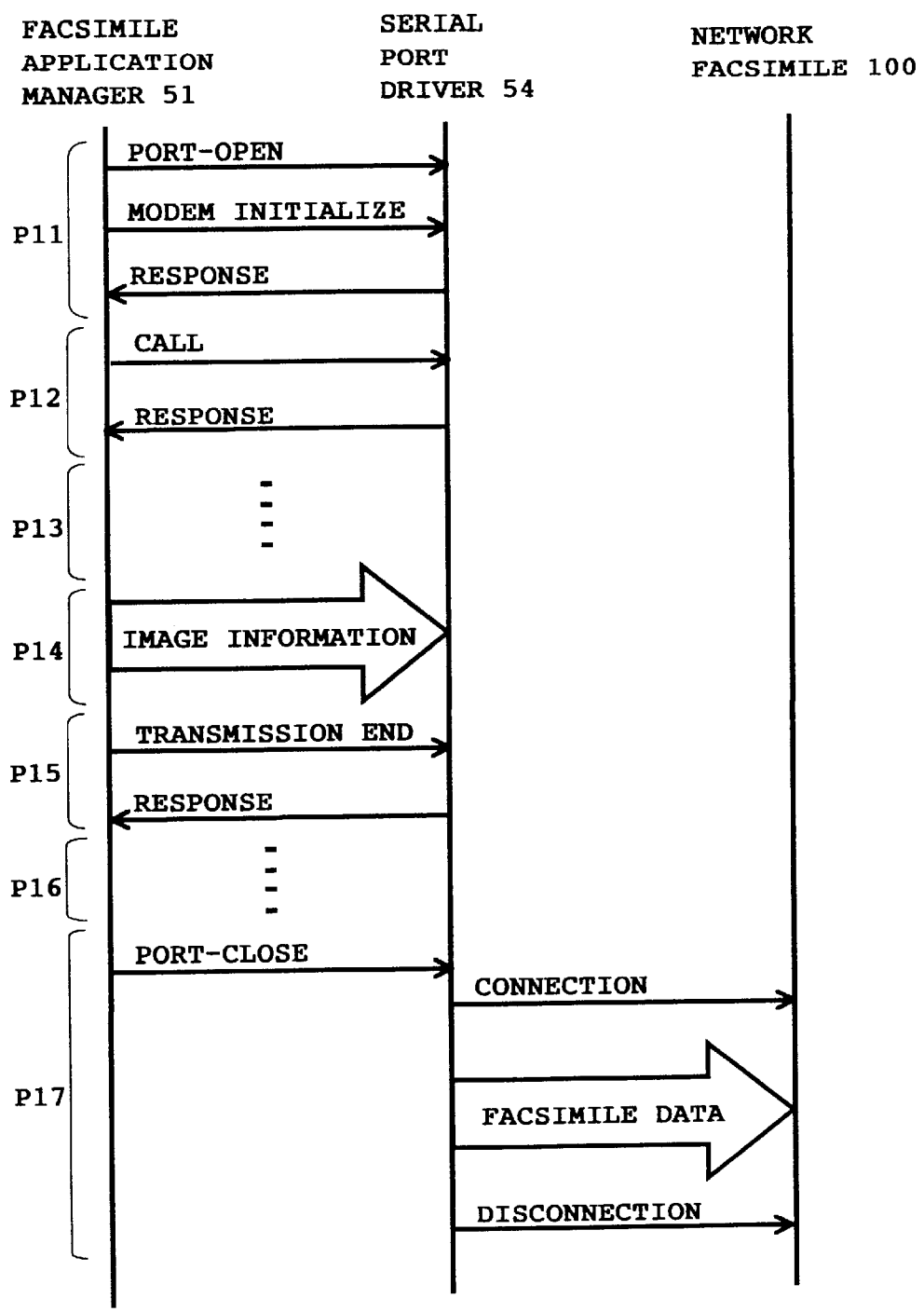
FIG. 6 is a diagram explaining an exemplary procedure of the facsimile communications operation between the client terminal apparatus of FIG. 3 and the network facsimile apparatus of FIG. 2.

Referring now to FIG. 6, an exemplary facsimile transmission operation of the facsimile operation controller 21a is provided for instances when the CL 103 sends image information to the network facsimile apparatus 100, wherein a final destination for image information to be transmitted is a specific facsimile terminal (e.g., FAX 121) As shown in FIG. 6, the facsimile transmission operation is split into a plurality of sequential Processes P11–P17, which partly correspond to the standardized sequential phases A–E of the Group 3 facsimile communications procedure.

This facsimile transmission operation starts with Process P11 which actually is a start-up process before entering into the standardized sequential phases A–E of the Group 3 facsimile communications procedure. In Process P11, the facsimile application manager 51 of the CL 103 gives the serial port driver 54 start-up instructions including a port-open instruction for activating the serial port and a modem command for initializing the facsimile modem functions. In responding to the start-up instructions given, the serial port driver 54 sends a responsive signal corresponding to the modem command back to the facsimile application manager 51.

In Process P12, which corresponds to phase A of the Group 3 facsimile communications procedure, the facsimile application manager 51 sends a modem command for requesting a transfer call to a specific facsimile machine connected to the PSTN 120 to the serial port driver 54. As this modem command includes the telephone number of the specific destination facsimile machine (e.g., the FAX 121), the serial port driver 54 stores the telephone number upon receiving the modem command. Then the serial port driver 54 sends a responsive signal corresponding to the modem command back to the facsimile application manager 51.

In Process P13, which corresponds to phase B of the Group 3 communications procedure, the facsimile application manager 51 and the serial port driver 54 perform a predetermined pre-transmission preparation process of the Group 3 facsimile communications procedure. Specifically, the facsimile application manager 51 sends various kinds of information to the serial port driver 54 during the pre-transmission procedure, including the properties of transmitting image information, such as image density, encoding method, data size, and so forth, and of the CL 103 itself, such as its own identification information. The serial port driver 54 stores the received information.

In Process P14, which corresponds to phase C of the Group 3 facsimile communications procedure, the facsimile application manager 51 sends the transmitting image information to the serial port driver 54, and the serial port driver 54 stores the transmitting image information received. Then, in Process P15, corresponding to phase D of the Group 3 facsimile communications procedure, the facsimile application manager 51 sends to the serial port driver 54 a modem command that indicates a completion of transmitting the image information and the serial port driver 54 responds to the received modem command by sending a corresponding responsive signal back to the facsimile application manager 51.

Subsequently, in Process P16, corresponding to phase E of the Group 3 facsimile communications procedure, the facsimile application manager 51 and the serial port driver 54 perform a predetermined post-transmission preparation process of the Group 3 facsimile communications procedure. After a completion of the predetermined post-transmission preparation, the process proceeds to Process P17.

In Process P17, the facsimile application manager 51 sends an instruction for closing the port to the serial port driver 54. Upon receiving the port-close instruction, the serial port driver 54 ends the communications with the facsimile application manager 51, and sends a request for communications to the network facsimile apparatus 100 via the LAN 102. Further, when the network facsimile apparatus 100 accepts the communications request and connects the line with the CL 103, the serial port driver 54 transmits a set of information to the network facsimile apparatus 100 via the LAN 102. At this time, the set of information includes the telephone number of the specific destination facsimile machine (e.g., the FAX 121), the various kinds of property information with respect to the image information, and the image information. After a completion of the information transmission, the serial port driver 54 sends a line disconnection instruction to the network facsimile apparatus 100.

In this way, the CL 103 performs the facsimile transmission operation so that the information necessary for sending image information to a specific facsimile machine connected to the PSTN 120 are properly transmitted to the network facsimile apparatus 100. After that, the network facsimile apparatus 100 can initiate a call to the destination facsimile machine (e.g., the FAX 121) using the telephone number provided. The network facsimile apparatus 100 can then transfer the image information, which is reformed based on the property information with respect to the image information, to the destination facsimile machine (e.g., the FAX 121). Thus, the transmission of image information from the CL 103 to an arbitrary facsimile machine connected to the PSTN 120 can be achieved, using the network facsimile apparatus 100.

As described above, in the above-described facsimile operation controller 21a of the CL 103, the serial port driver 54 is configured to communicate with the facsimile application manager 51 so that the facsimile application manager 51 is not required to communicate directly with the network facsimile apparatus 100. The facsimile application manager 51 can accordingly avoid a problematic time delay in the communications with the network facsimile apparatus 100 through the Group 3 facsimile communications procedure. Thus, the CL 103 can properly perform the facsimile transmission operation to the network facsimile apparatus 100 without an error caused due to the delay time.

Figure 7:
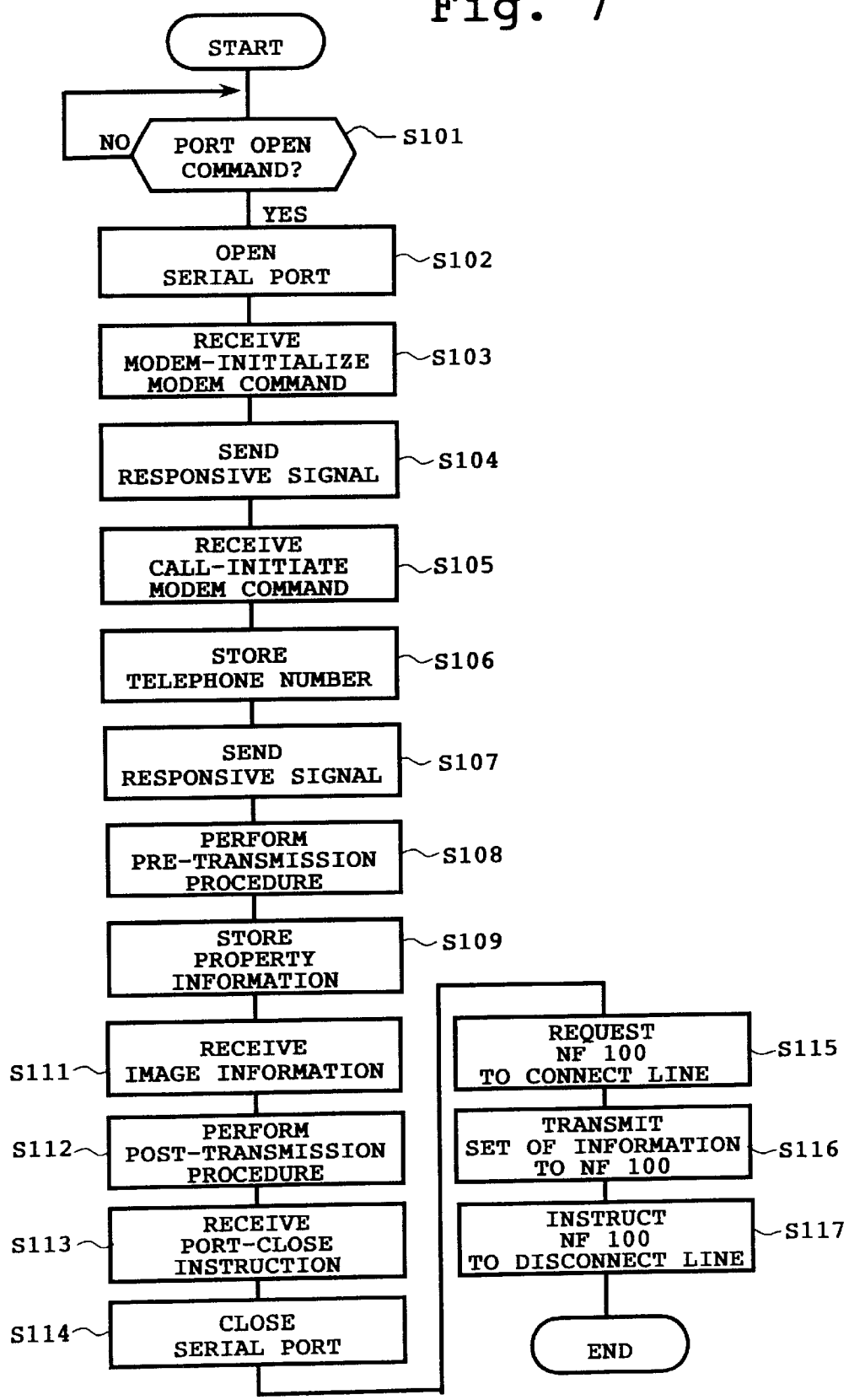
FIG. 7 is a flowchart of an exemplary operation of the client terminal apparatus of FIG. 3 in accordance with the procedure of the facsimile communications operation of FIG. 6.

An exemplary procedure of the CL 103's operation during the above-described facsimile transmission operation will now be described with reference to FIG. 7. In Step S101 of FIG. 7, the serial port driver 54 continuously checks if a port-open instruction from the facsimile application manager 51 is detected. If the instruction is detected, the serial port driver 54 turns into an port-open mode in Step S102. Then, the serial port driver 54 receives a modem command for initializing the modem from the facsimile application manager 51 in Step S103, and sends a corresponding responsive signal to the facsimile application manager 51 in Step S104.

In Step S105, the serial port driver 54 receives the modem command for requesting a transfer call to the specific facsimile machine connected to the PSTN 120. The serial port driver 54 then draws the telephone number of that specific facsimile machine from the received modem command and stores the telephone number in Step S106, and subsequently sends a responsive signal corresponding to the modem command back to the facsimile application manager 51 in Step S107.

In Step S108, the serial port driver 54 performs the predetermined pre-transmission procedure of the Group 3 facsimile communications procedure with the facsimile application manager 51. In Step S109, the serial port driver 54 stores the various kinds of information which are included in the signals sent from the facsimile application manager 51 during the above-mentioned pre-transmission procedure. The information includes the properties of transmitting image information, such as image density, encoding method, data size, and so forth, and of the CL 103 itself, such as its own identification information.

In Step S111, the serial port driver 54 receives and stores image information transmitted from the facsimile application manager 51. In Step S112, after a completion of image information transmission, the serial port driver 54 performs the predetermined post-transmission procedure of the Group 3 facsimile communication procedure with the facsimile application manager 51. Then, the serial port driver 54 receives an instruction for closing the port in Step S113 and responds to the instruction by turning the mode into the closed-port mode in Step S114.

In Step S115, the serial port driver 54 sends a request for establishing a line connection to the network facsimile apparatus 100 via the LAN interface 26 of the LC 103 and the LAN 102. In Step S116, if the network facsimile apparatus 100 accepts the request and connects the line, the serial port driver 54 transmits a set of the stored information to the network facsimile apparatus 100 via the LAN interface 26 of the LC 103 and the LAN 102. The set of information includes the telephone number of the specific facsimile machine connected to the PSTN 120, the properties of transmitting image information such as an image density, an encoding method, a data size, and the image information. Finally, in Step S117, upon completing the information transmission performed in Step S116, the serial port driver 54 sends an instruction for disconnecting the network communications to the network facsimile apparatus 100.

Figure 8:
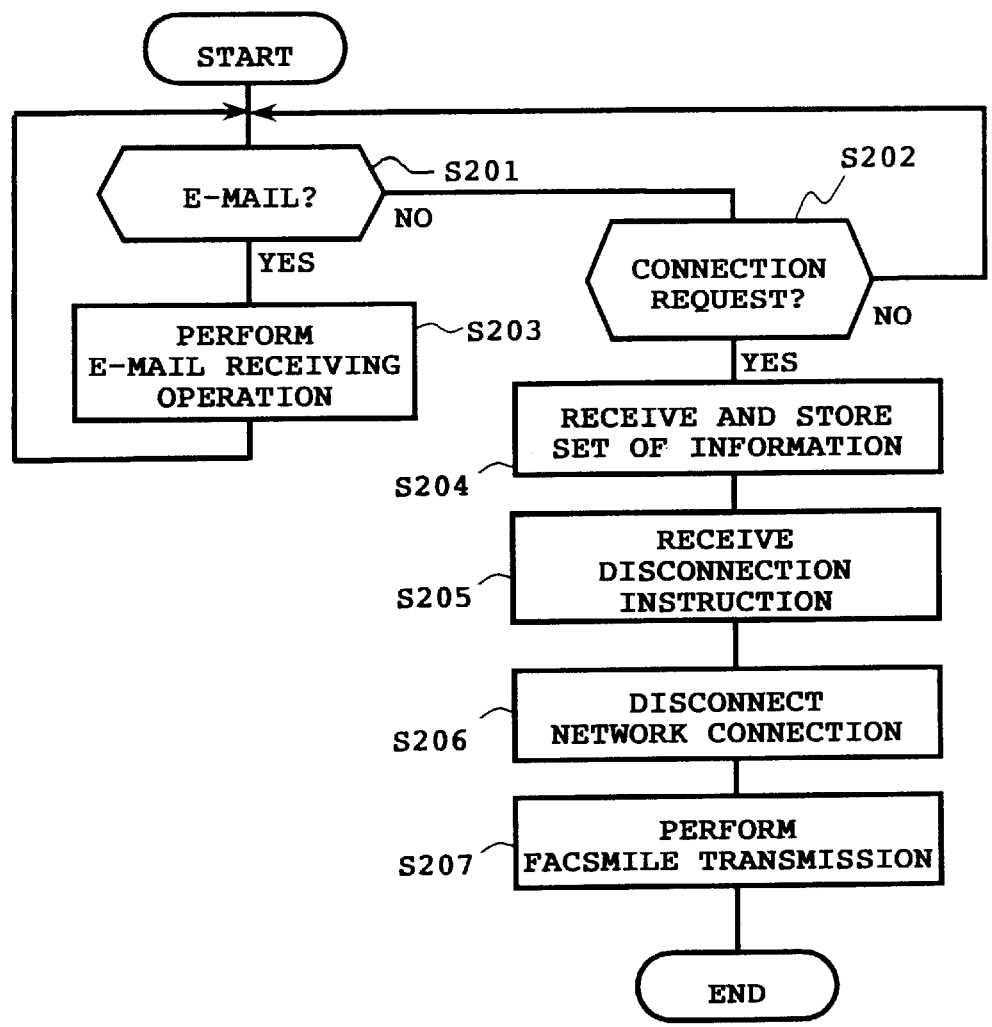
FIG. 8 is a flowchart of an exemplary operation of the network facsimile apparatus of FIG. 2 in accordance with the procedure of the facsimile communications operation of FIG. 6.

FIG. 8 explains an exemplary procedure of the network facsimile apparatus 100's operation during the above-described facsimile transmission operation. In the network facsimile apparatus 100 the system controller 1 keeps constant watch on an incoming signal from outside and checks if it is an electronic mail in Step S201 and if it is a request for the network communications in Step S202, as shown in FIG. 8. If the check result of Step S201 is YES, meaning that the network facsimile apparatus 100 receives an electronic mail, the system controller 1 performs a predetermined operation for receiving electronic mail in Step S203, and the process returns to Step S201. If the check result of Step S201 is NO, meaning that the network facsimile apparatus 100 receives no electronic mail, the process proceeds to Step S202 where it is monitored if the network facsimile apparatus 100 receives a network communications request.

If the network facsimile apparatus 100 receives no network communications request and the check result of Step S202 is NO, the process returns to Step S201. If the network facsimile apparatus 100 receives the network communications request and the check result of Step S202 is YES, the process proceeds to Step S204 and the system controller 1 arranges to send a corresponding responsive signal back to the sending CL 103. Also, in Step S204, the system controller 1 receives a set of information from the sending CL 103 via the LAN 102, and stores the set of information into the system memory 2.

The set of information includes the telephone number of the specific facsimile machine connected to the PSTN 120, the properties of transmitting image information-such as an image density, an encoding method, a data size, and the image information. Then, the system controller 1 receives a network disconnect instruction in Step S205 and disconnects the network connection with the sending CL 103 in Step S206. Upon a disconnection of the network connection with the sending CL 103, the system controller 1 performs a facsimile transmission operation, in Step S207, so as to call a destination facsimile machine, connected to the PSTN 120 using the stored telephone number and send the stored image information to the destination facsimile machine.

Figure 9:
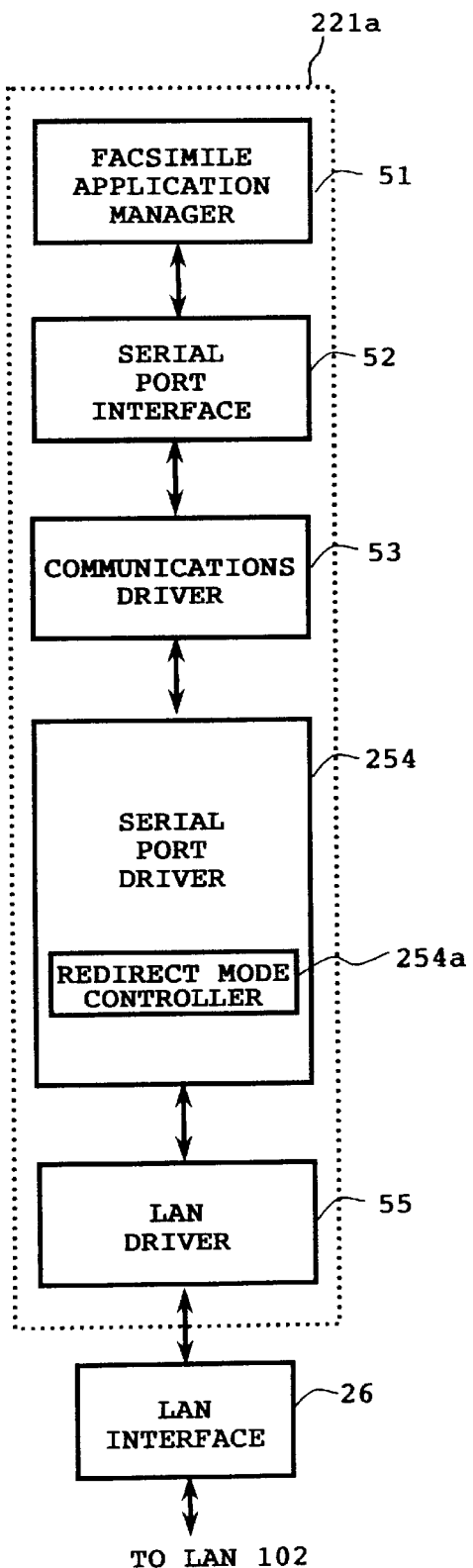
FIG. 9 is a block diagram of a main part of a second exemplary central processing unit.

Next, a second embodiment of the facsimile application controller is explained with reference to FIGS. 9–12. A second embodiment of the facsimile application controller is referred to as a facsimile application controller 221a. As shown in FIG. 9, the facsimile application controller 221a is similar to the facsimile application controller 21a of FIG. 5, except for the configuration of the serial port driver. The serial port driver of the facsimile application controller 221a is provided with a reference numeral 254, as shown in FIG. 9. The serial port driver 254 of the facsimile application controller 221a includes a redirect mode controller 254a that switches the communications between the facsimile application manager 51 and the network facsimile apparatus 100 between indirect and direct modes. Accordingly, in the following description, a CPU (central processing unit) which includes the facsimile operation controller 221a in place of the facsimile operation controller 21a is referred to as a CPU 221 (not shown), and a client terminal which includes such a CPU 221 in place of the CPU 21 is referred to as a CL 203 (not shown).

Figure 10:
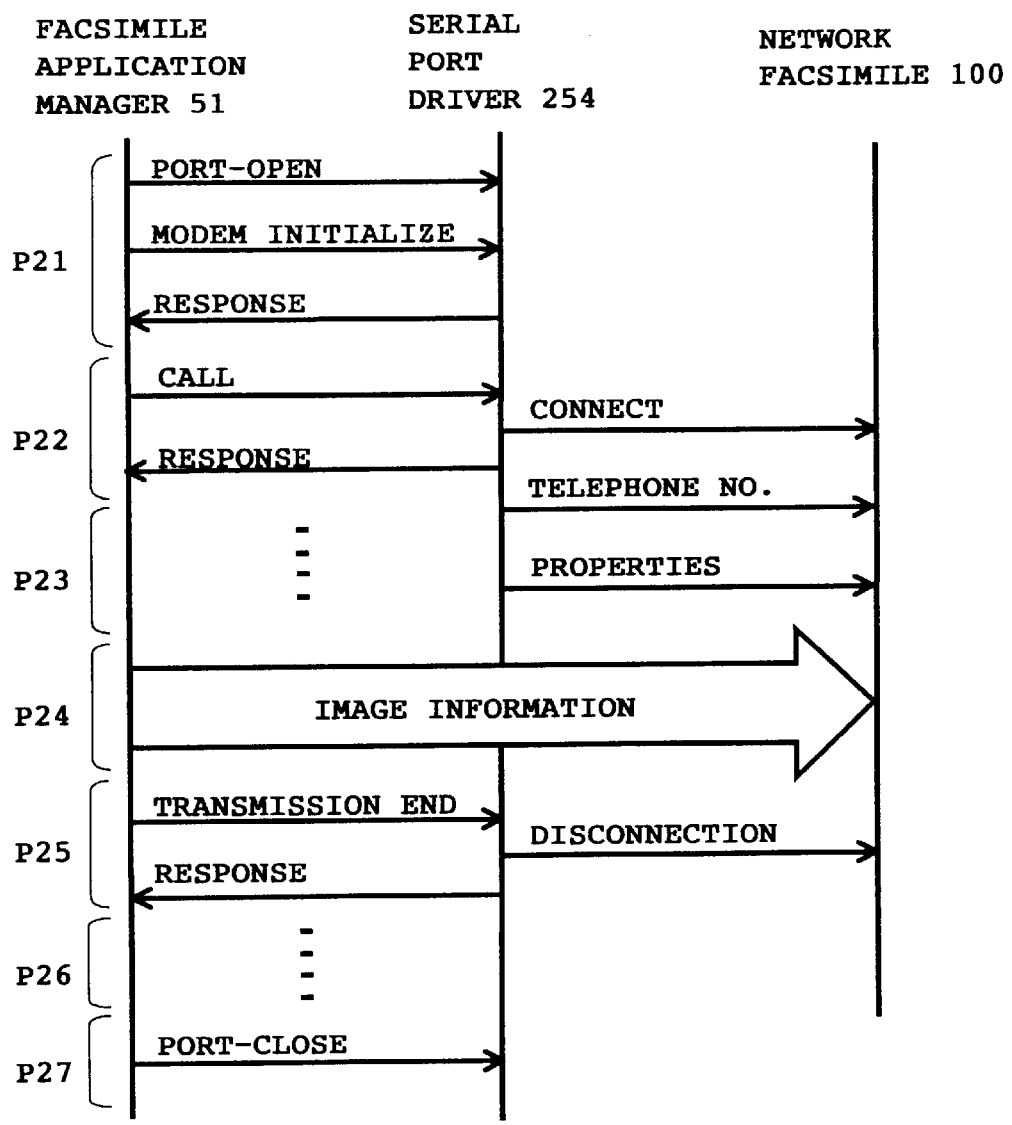
FIG. 10 is a diagram explaining an exemplary procedure of the facsimile communications operation by the second exemplary central processing unit of FIG. 9.

An exemplary facsimile transmission operation of the facsimile application controller 221a for instances when one of the CLs 203 sends image information to the network facsimile apparatus 100 is represented in FIG. 10. As shown in FIG. 10, the facsimile transmission operation is split into a plurality of sequential Processes P21–P27, which partly corresponds to the standardized sequential phases A–E of the Group 3 facsimile communications procedure.

This facsimile transmission operation starts with Process P21 which is a start-up process before entering into the standardized sequential phases A–E of the Group 3 facsimile communications procedure. In Process P21, the facsimile application manager 51 of the CL 103 gives the serial port driver 254 start-up instructions including the port-open instruction and the modem command for initializing the facsimile modem functions. In responding to the start-up instructions given, the serial port driver 254 sends the responsive signal corresponding to the modem command back to the facsimile application manager 51.

In Process P22, which corresponds to phase A of the Group 3 facsimile communications procedure, the facsimile application manager 51 sends the modem command for requesting a transfer call to a specific facsimile machine connected to the PSTN 120 to the serial port driver 254. Upon receiving the modem command which includes a telephone number of the specific destination facsimile machine (e.g., the FAX 121), the serial port driver 254 draws and stores the telephone number. Then, the serial port driver 254 returns the responsive signal corresponding to the modem command back to the facsimile application manager 51.

In Process P23, which corresponds to phase B of the Group 3 communications procedure, the facsimile application manager 51 and the serial port driver 254 perform a predetermined pre-transmission preparation process of the Group 3 facsimile communications procedure. Specifically, the facsimile application manager 51 sends various kinds of information to the serial port driver 254 during the pre-transmission procedure, including the properties of transmitting image information, such as image density, encoding method, data size, and so forth, and of the CL 203 itself, such as its own identification information. The serial port driver 254 stores the received information.

Also, in Processes P22 and P23, upon receiving the modem command for requesting a transfer call to a specific facsimile machine connected to the PSTN 120, the serial port driver 254 sends the request for communications to the network facsimile apparatus 100 via the LAN 102. If the network facsimile apparatus 100 accepts the communications request and connects the line with the CL 203, the serial port driver 254 transmits a set of the information to the network facsimile apparatus 100 via the LAN 102. At this time, the set of information includes the telephone number of the specific destination facsimile machine (e.g., the FAX 121) and the various kinds of property information with respect to the image information. The network facsimile apparatus 100 stores the set of information upon its receipt.

In Process P24, which corresponds to phase C of the Group 3 facsimile communications procedure, the direct mode controller 254a of the serial port driver 254 establishes a redirect mode in which the facsimile application manager 51 sends the transmitting image information straight to the network facsimile apparatus 100 as if the facsimile application manager 51 is communicating directly with the network facsimile 100. The network facsimile apparatus 100 stores the image information upon its receipt. The redirect mode will be continued until the facsimile application manager 51 completes the transmission of image information.

In Process P25, corresponding to phase D of the Group 3 facsimile communications procedure, the facsimile application manager 51 sends to the serial port driver 254 a modem command that indicates a completion of transmitting the image information. Upon receiving such a modem command, the serial port driver 254 sends a line disconnection instruction to the network facsimile apparatus 100. Then, the serial port driver 254 returns a responsive signal corresponding to the modem command back to the facsimile application manager 51.

In Process P26, corresponding to phase E of the Group 3 facsimile communications procedure, the facsimile application manager 51 and the serial port driver 254 perform a predetermined post-transmission preparation process of the Group 3 facsimile communications procedure. After a completion of the predetermined post-transmission preparation, the process proceeds to Process P27 and the facsimile application manager 51 sends an instruction for closing the port to the serial port driver 254. Then, the serial port driver 254 ends the communications with the facsimile application manager 51 upon receiving such a port closing instruction from the facsimile application manager 51.

In this way, the CL 203 is configured to transfer the information, necessary for a transmission of image information to a specific facsimile machine connected to the PSTN 120, to the network facsimile apparatus 100. The network facsimile apparatus 100 can later initiate a call to the destination facsimile machine (e.g., the FAX 121) using the telephone number given, so as to perform the facsimile transmission operation. Thereby, the network facsimile apparatus 100 can transfer the image information, which is reformed based on the property information with respect to the image information, to the destination facsimile machine (e.g., the FAX 121), in accordance with the request for the image information transfer from the CL 203 without causing a time delay.

As described above, in the second embodiment of the facsimile operation controller of the CL 203, the serial port driver 254 is configured to select the modes for the facsimile transmission operation. In one mode, the serial port driver 254 communicates with the facsimile application manager 51 so as to be a communications buffer to the network facsimile apparatus 100. In the other mode, the serial port driver 254 sets the condition in which the facsimile application manager 51 can directly communicate with the network facsimile 100. As a result, the facsimile application manager 51 can perform the facsimile transmission operation in a preferred manner, avoiding a problematic time delay in the communications with the network facsimile apparatus 100 through the Group 3 facsimile communications procedure. Accordingly, the CL 203 can properly perform the facsimile transmission operation without an error caused due to the time delay.

In an event that during the above-described facsimile transmission operation the network facsimile apparatus 100 causes a problem in that the image memory 9 is fully occupied and has no more space for storing the image information, the facsimile application manager 51 can detect such a problem of the image memory 9 because of the direct transmission in the redirect mode of the Process 24. Accordingly, the facsimile application manager 51 may turn into a communications error mode so as to restart the facsimile transmission operation later on. Thereby, the CL 203 can perform the facsimile transmission operation with the network facsimile apparatus 100 in a highly reliable manner.

Figure 11:
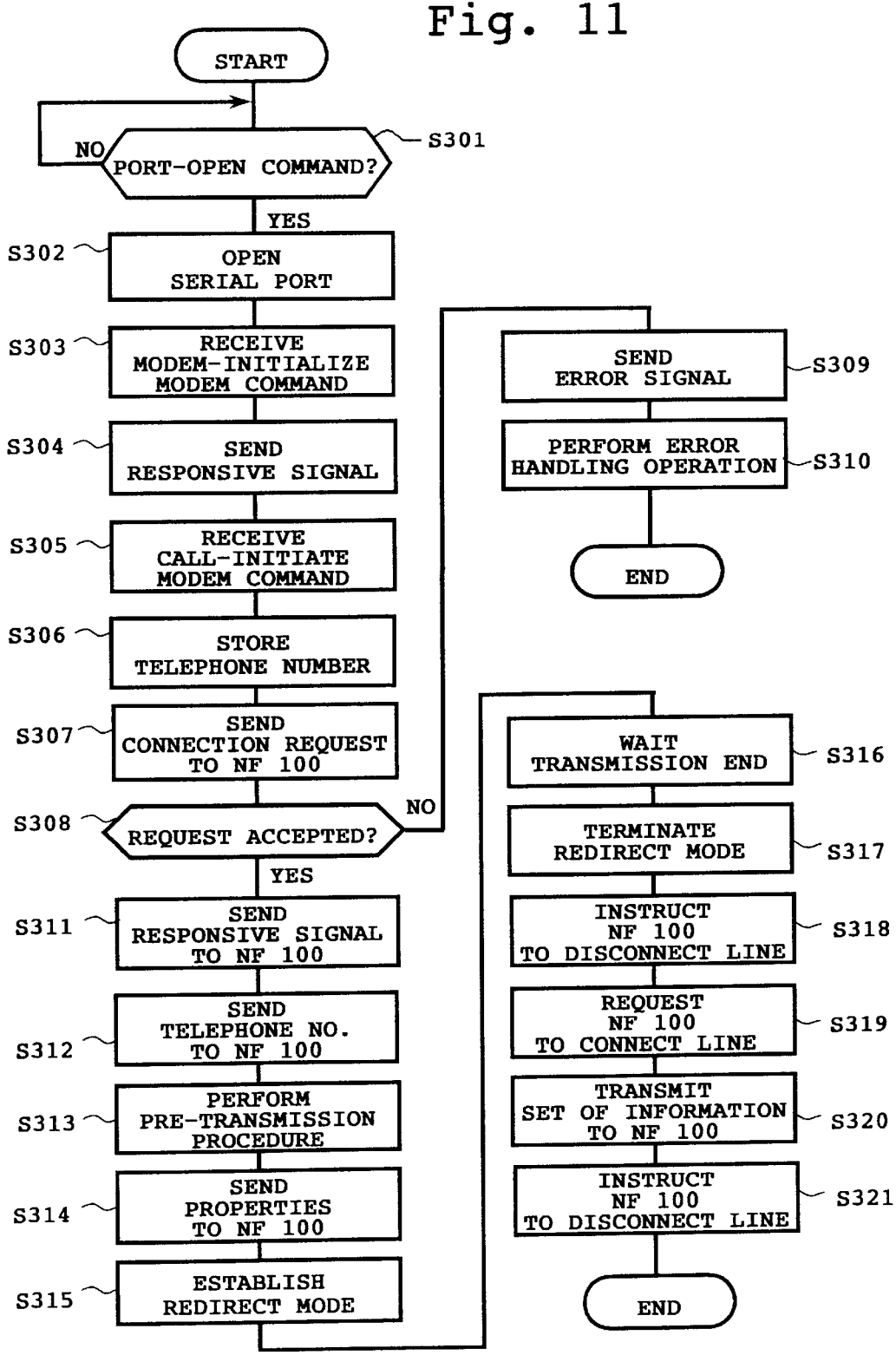
FIG. 11 is a flowchart of an exemplary operation of the client terminal apparatus in accordance with the procedure of the facsimile communications operation of FIG. 10.

An exemplary procedure of the CL 203's operation during the above-described facsimile transmission operation of FIG. 10 will now be described with reference to FIG. 11. In Step S301 of FIG. 11, the serial port driver 254 continuously checks if the port-open instruction from the facsimile application manager 51 is detected. If the instruction is detected, the serial port driver 254 turns into the port-open mode in Step S302. Then, the serial port driver 254 receives the modem command for initializing the modem from the facsimile application manager 51 in Step S303, and sends the corresponding responsive signal to the facsimile application manager 51 in Step S304.

In Step S305, the serial port driver 254 receives the modem command for requesting a transfer call to the specific facsimile machine connected to the PSTN 120. The serial port driver 254 then draws the telephone number of that specific facsimile machine from the received modem command and stores the telephone number in Step S306. Subsequently, in Step S307, the serial port driver 54 sends the request for establishing a line connection to the network facsimile apparatus 100, via the LAN interface 26 of the LC 103 and the LAN 102, in order to request a transmission of image information to the specific facsimile machine having that telephone number.

In Step S308, the serial port driver 254 checks if the network facsimile apparatus 100 returns an acceptance signal in response to the request. If no acceptance signal from the network facsimile apparatus 100 is detected in Step S308, the serial port driver 254 sends an error signal to the facsimile application manager 51 in Step S309. In this case, the serial port driver 254 performs an error handling operation in Step S310, and the process ends.

If an acceptance signal from the network facsimile apparatus 100 is detected in Step S308, the serial port driver 254 sends a corresponding responsive signal back to the facsimile application manager 51 in Step S311. Then, as the serial port driver 254 is connected to the network facsimile apparatus 100, the serial port driver 254 sends the stored telephone number of the specific facsimile machine connected to the PSTN 120, in Step S312.

In Step S313, the serial port driver 254 performs the redetermined pre-transmission procedure of the Group 3 facsimile communications procedure with the facsimile application manager 51. At this time, the serial port driver 254 stores the various kinds of information included in the signals sent from the facsimile application manager 51 during the above-mentioned pre-transmission procedure. In Step S314, the serial port driver 254 transmits a set of the stored information to the network facsimile apparatus 100 via the LAN interface 26 of the LC 103 and the LAN 102. The set of information includes the properties of the transmitting image information, such as image density, encoding method, data size, and so forth, and of the CL 203 itself, such as its own identification information.

In Step S315, the redirect mode controller 254a of the serial port driver 254 establishes the redirect mode between the facsimile application manager 51 and the network facsimile apparatus 100. Then, in Step S316, the serial port driver 254 turns into a wait mode waiting until the image information transmission is completed. Upon a completion of the image information transmission, the redirect mode controller 254a of the serial port driver 254 terminates the redirect mode, in Step S317.

Then, the serial port driver 254 sends the instruction for disconnecting the network communications to the network facsimile apparatus 100 in Step S117 and performs the predetermined post-transmission procedure of the Group 3 facsimile communication procedure with the facsimile application manager 51 in Step S318. Upon receiving the instruction for closing the port from the facsimile application manager 51 in Step S320, the serial port driver 254 responds to the instruction by turning the mode into the closed-port mode in Step S321. Then, the process ends.

Figure 12:
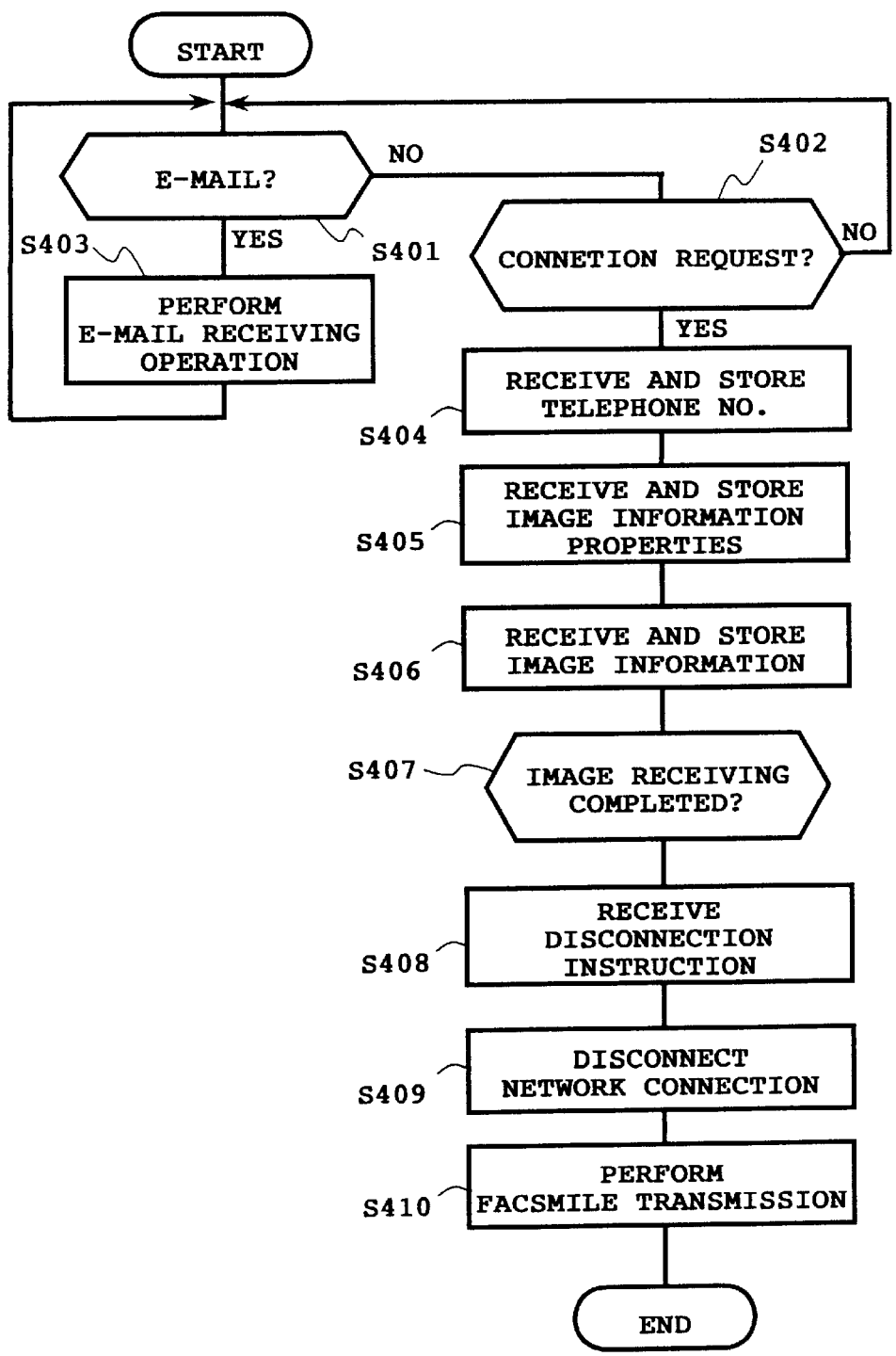
FIG. 12 is a flowchart of an exemplary operation of the network facsimile apparatus in accordance with the procedure of the facsimile communications operation of FIG. 10.

FIG. 12 explains an exemplary procedure of the network facsimile apparatus 100's operation during the facsimile transmission operation of FIG. 10. In the network facsimile apparatus 100, the system controller 1 keeps constant watch on an incoming signal from outside and checks if it is an electronic mail in Step S401 and if it is a request for the network communications in Step S402, as shown in FIG. 12. If the check result of Step S401 is YES, meaning that the network facsimile apparatus 100 receives an electronic mail, the system controller 1 performs a predetermined operation for receiving electronic mail in Step S403, and the process returns to Step S401. If the check result of Step S401 is NO, meaning that the network facsimile apparatus 100 receives no electronic mail, the process proceeds to Step S402 where if the network facsimile apparatus 100 receives a network communications request is monitored.

If the network facsimile apparatus 100 receives no network communications request and the check result of Step S402 is NO, the process returns to Step S401. If the network facsimile apparatus 100 receives the network communications request and the check result of Step S402 is YES, the process proceeds to Step S404 and the system controller 1 arranges to send the corresponding responsive signal back to the sending CL 203. Also, in Step S404, the system controller 1 receives the information of the telephone number for the specific facsimile machine from the sending CL 203 via the LAN 102, and stores the information into the system memory 2. In Step S405, the system controller 1 receives further information from the sending CL 203, including the properties of transmitting image information such as an image density, an encoding method, a data size, and the image information.

Then, in Step S406, the system controller 1 performs the facsimile modem operation and stores the received image information. In Step 8407, the system controller 1 checks if the image information transmission is completed. Only if the image information transmission is completed and the check result of Step S407 is YES, the process proceeds to Step S408 and the system controller 1 receives the network disconnection instruction. Then, in Step S409, the system controller 1 disconnects the network connection with the sending CL 203. Upon the disconnection of the network connection with the sending CL 203, the system controller 1 calls a destination facsimile machine connected to the PSTN 120 using the stored telephone number and send the stored image information to the destination facsimile machine.

Figure 13:
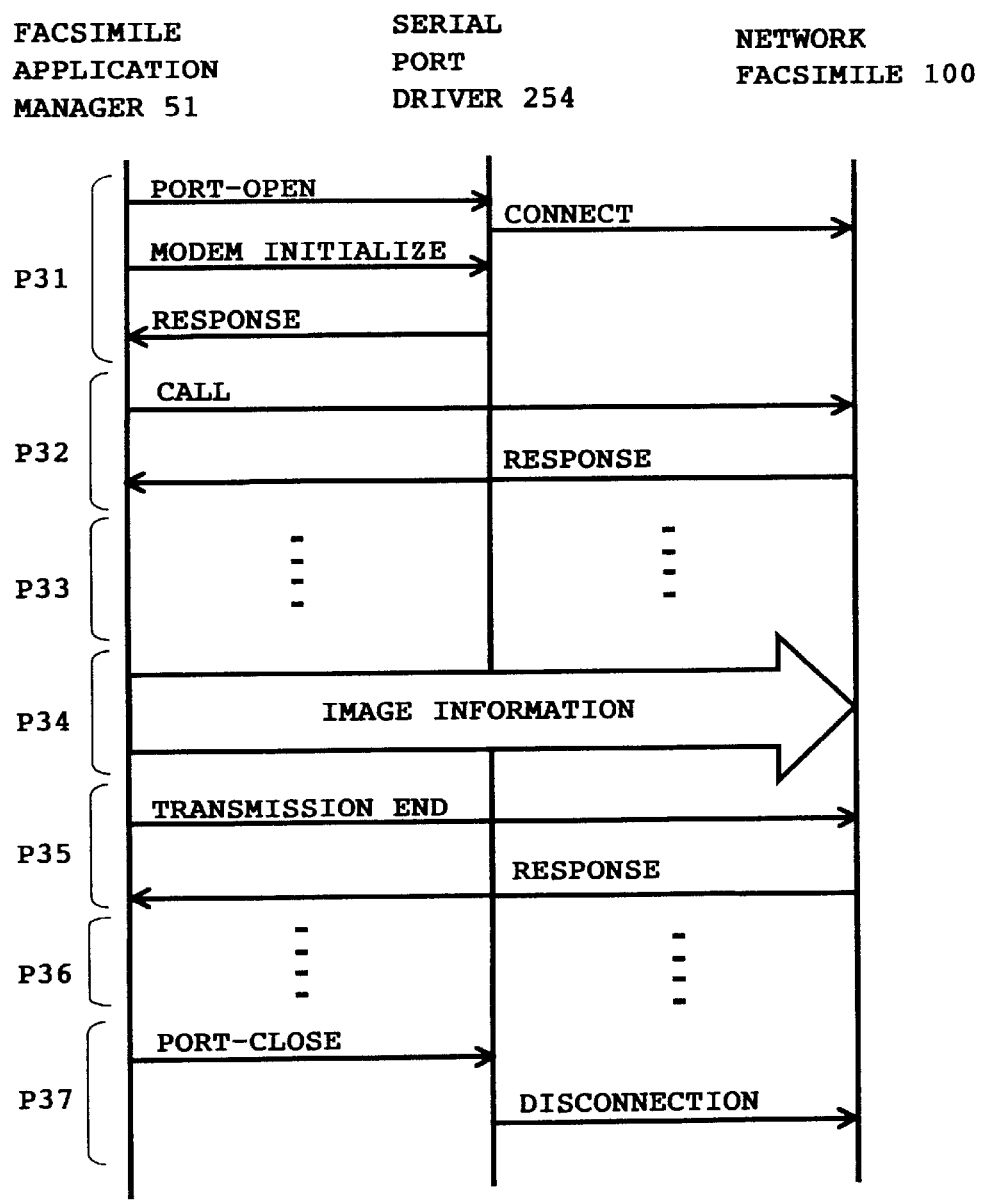
FIG. 13 is a diagram explaining a modified exemplary procedure of the facsimile communications operation by the second exemplary central processing unit of FIG. 9.
Figure 14:
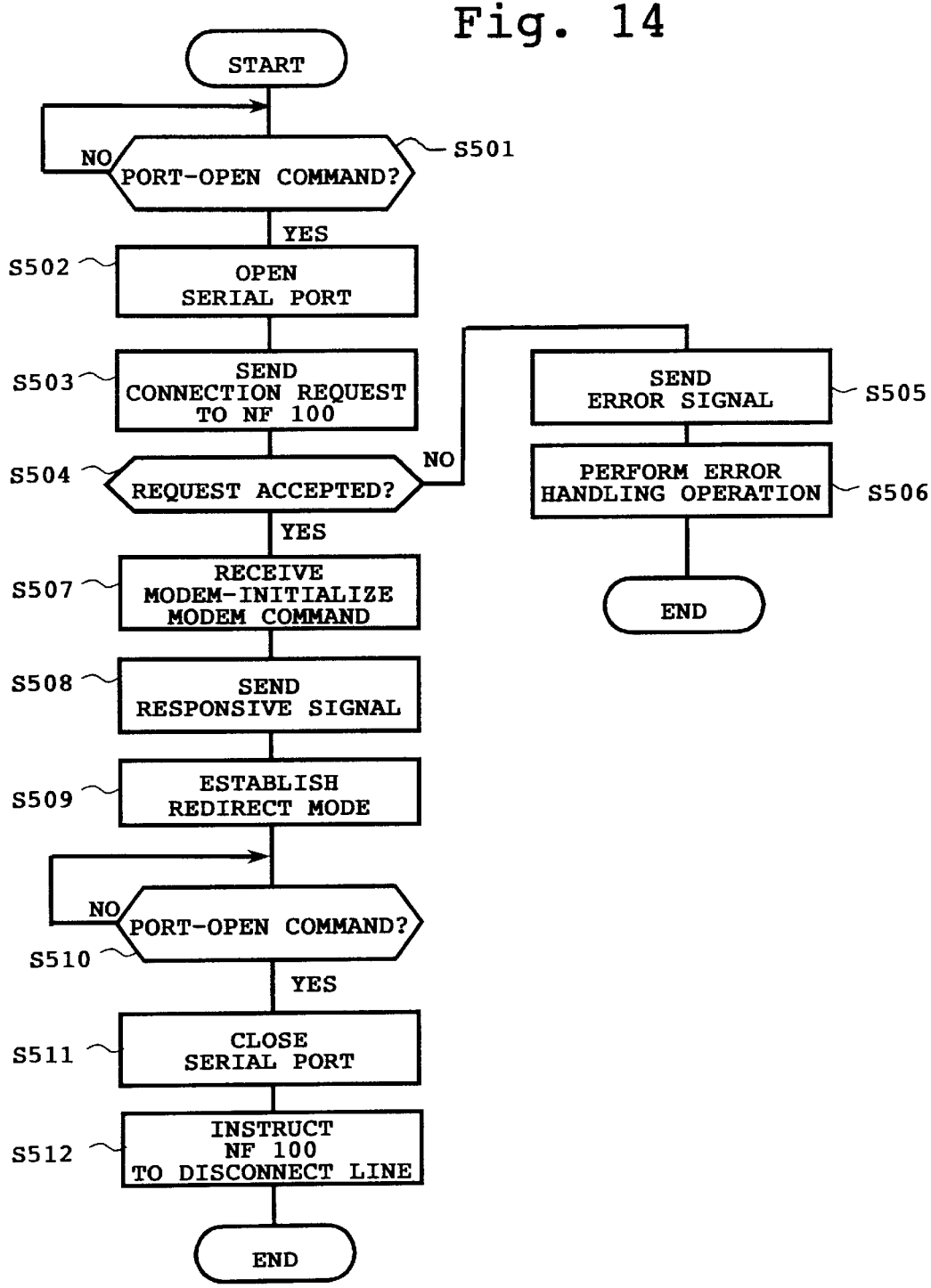
FIG. 14 is a flowchart of an exemplary operation of the client terminal apparatus in accordance with the procedure of the facsimile communications operation of FIG. 13.
Figure 15:
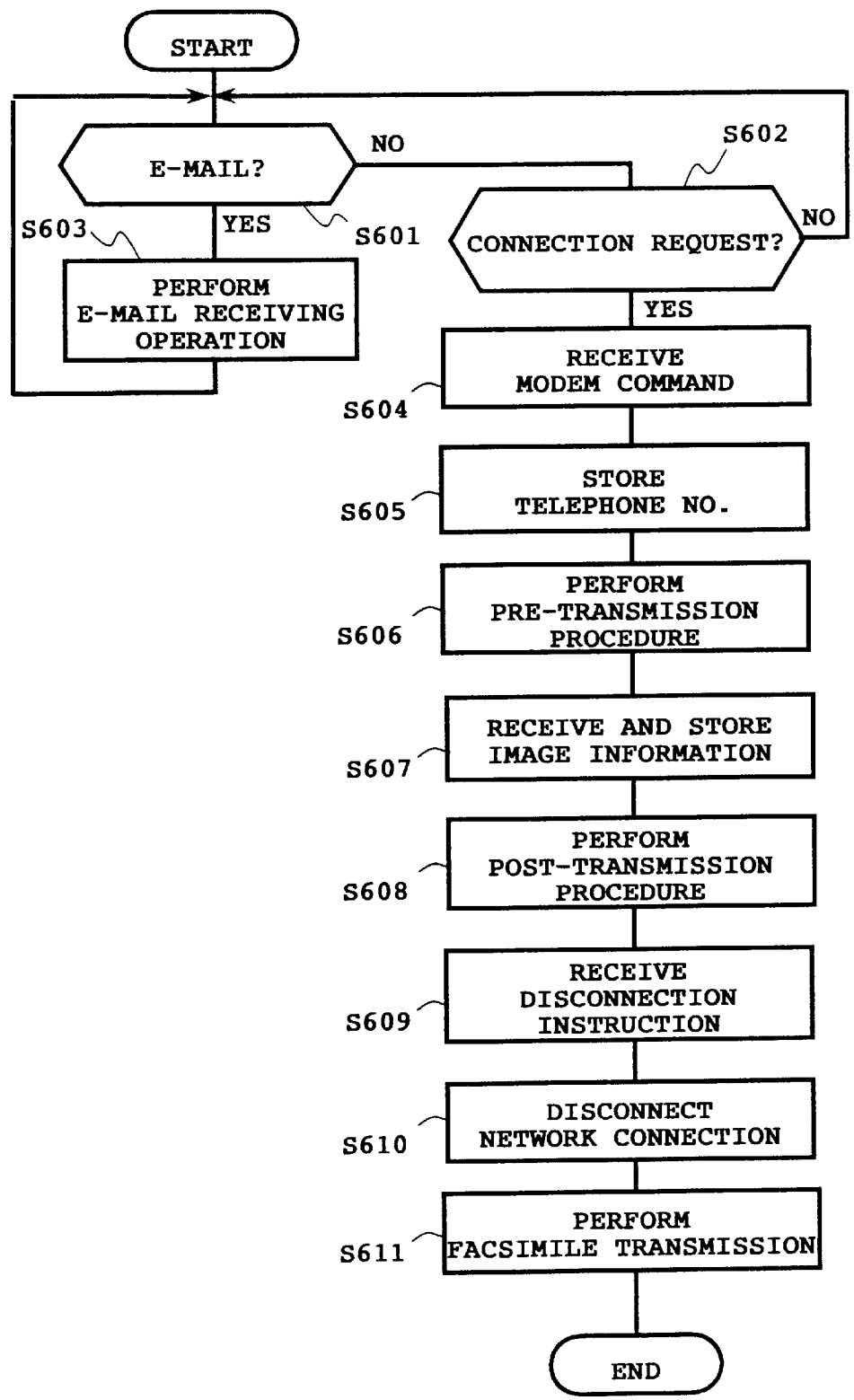
FIG. 15 is a flowchart of an exemplary operation of the network facsimile apparatus in accordance with the procedure of the facsimile communications operation of FIG. 13.

Next, a modified exemplary facsimile transmission operation by the facsimile application controller 221a of FIG. 9 is explained with 1 reference to FIGS. 13–15. FIG. 13 demonstrates an outline of the modified exemplary facsimile transmission operation by the facsimile application controller 221a of FIG. 9. As shown in FIG. 13, the modified exemplary facsimile transmission operation is split into a plurality of sequential Processes P31–P37, which partly corresponds to the standardized sequential phases A–E of the Group 3 facsimile communications procedure.

This facsimile transmission operation starts with Process P31 which is a- start-up process before entering into the standardized sequential phases A–E of the Group 3 facsimile communications procedure. In Process P31, the facsimile application manager 51 of the CL 203 gives the serial port driver 254 start-up instructions including the port-open instruction and the modem command for initializing the facsimile modem functions. The serial port driver 254 opens the serial port in response to the port-open instruction and sends the communications request to the network facsimile apparatus 100 via the LAN 102. If the network facsimile apparatus 100 accepts the request for communications, the redirect mode controller 254a of the serial port driver 254 establishes the redirect mode between the facsimile application manager 51 and the network facsimile apparatus 100.

Then, the serial port driver 254 returns the corresponding responsive signal back to the facsimile application manager 51 in response to the modem command.

In Process P32, which corresponds to the phase A of the Group 3 facsimile communications procedure, the facsimile application manager 51 sends the modem command for requesting a transfer call to a specific facsimile machine connected to the PSTN 120 to the network facsimile apparatus 100 in the redirect mode. As this modem command includes a telephone number of the specific destination facsimile machine (e.g., the FAX 121), the network facsimile apparatus 100 draws and stores the telephone number upon receiving the modem command. Then, the network facsimile apparatus 100 sends the corresponding responsive signal back to the facsimile application manager 51.

In Process P33, which corresponds to the phase B of the Group 3 communications procedure, the facsimile application manager 51 and the network facsimile apparatus 100 perform the predetermined pre-transmission preparation process of the Group 3 facsimile communications procedure. Specifically, the facsimile application manager 51 sends various kinds of information to the network facsimile apparatus 100 during the pre-transmission procedure, including the properties of transmitting image information, such as image density, encoding method, data size, and so forth, and of the CL 203 itself, such as its own identification information. The network facsimile apparatus 100 accordingly stores the received information In Process P34, which corresponds to the phase C of the Group 3 facsimile communications procedure, the facsimile application manager 51 sends the transmitting image information straight to the network facsimile apparatus 100. The network facsimile apparatus 100 stores the image information upon its receipt. The redirect mode will be continued until the facsimile application manager 51 completes the transmission of image information.

In Process P35, corresponding to the phase D of the Group 3 facsimile communications procedure, the facsimile applications manager 51 sends to the network facsimile apparatus 100 the modem command indicating that the transmission of image information is completed, and the network facsimile apparatus 100 responds to the received modem command by sending a corresponding responsive signal back to the facsimile application manager 51. Subsequently, in Process P36, corresponding to the phase E of the Group 3 facsimile communications procedure, the facsimile application manager 51 and the network facsimile apparatus 100 perform the predetermined post-transmission preparation process of the Group 3 facsimile communications procedure.

After a completion of the predetermined post-transmission preparation, the process proceeds to Process P37 and the facsimile application manager 51 sends the port-close instruction to the serial port driver 254. Consequently, the serial port driver 254 closes the serial port in response to the port-close instruction and the redirect mode controller 254a of the serial port driver 254 terminates the redirect mode. Then, the serial port driver 254 ends the communications with the facsimile application manager 51 and disconnects the network connection with the network facsimile apparatus 100.

In this way, the CL 203 transmits the information, necessary for sending image information to a specific facsimile machine connected to the PSTN 120, to the network facsimile apparatus 100. Then, the network facsimile apparatus 100 can send a call to the destination facsimile machine (e.g., the FAX 121) using the given telephone number so as to perform the facsimile transmission operation. Thereby, the network facsimile apparatus 100 can transmit the image information, which is reformed based on the property information with respect to the stored image information, to the destination facsimile machine (e.g., the FAX 121).

An exemplary procedure of the CL 203's operation during the above-described modified facsimile transmission operation of FIG. 13 is described with reference to FIG. 14. In Step S501 of FIG. 14, the serial port driver 254 continuously checks if the port-open instruction from the facsimile application manager 51 is detected. If the instruction is detected, the serial port driver 254 turns into the port-open mode in Step S502. Then, in Step S503, the serial port driver 254 sends a request for establishing a line connection to the network facsimile apparatus 100, via the LAN interface 26 of the LC 203 and the LAN 102, in order to request a transmission of image information to the specific facsimile machine having that telephone number.

In Step S504, the serial port driver 254 checks if the network facsimile apparatus 100 returns the acceptance signal in response to the request. If no acceptance signal from the network facsimile apparatus 100 is detected in Step S504, the serial port driver 254 sends the error signal to the facsimile application manager 51 in Step S505. In this case, the serial port driver 254 performs the error handling operation in Step S506, and the process ends. If the acceptance signal from the network facsimile apparatus 100 is detected in Step S504, the serial port driver 254 receives the modem command for initializing the modem from the facsimile application manager 51 in Step S507, and sends the corresponding responsive signal to the facsimile application manager 51 in Step S508. In Step S509, the redirect mode controller 254a of the serial port driver 254 establishes the redirect mode between the facsimile application manager 51 Under the redirect mode, the facsimile application manager 51 and the network facsimile apparatus 100 can directly communicate as if these two units are directly connected. Then, in Step S510, the serial port driver 254 turns into the wait mode waiting for the port-close instruction from the facsimile application manager 51. Only when the port-close instruction is detected by the serial port driver 254 in Step S510, the process proceeds to Step S511 where the serial port driver 254 closes the port. Then, in Step S512, the serial port driver 254 sends the network disconnection instruction to the network facsimile apparatus 100. The process then ends.

FIG. 15 explains an exemplary procedure of the network facsimile apparatus 100's operation during the above-described modified facsimile transmission operation of FIG. 13. In the network facsimile apparatus 100, the system controller 1 keeps constant watch on an incoming signal from outside and checks if it is an electronic mail in Step S601 and if it is the request for the network communications in Step S602, as shown in FIG. 15. If the check result of Step S601 is YES, meaning that the network facsimile apparatus 100 receives an electronic mail, the system controller 1 performs the predetermined operation for receiving electronic mail in Step S603, and the process returns to Step S601. If the check result of Step S601 is NO, meaning that the network facsimile apparatus 100 receives no electronic mail, the process proceeds to Step S602 where if the network facsimile apparatus 100 receives the network communications request is monitored.

If the network facsimile apparatus 100 receives no network communications request and the check result of Step S602 is NO, the process returns to Step S601. If the network facsimile apparatus 100 receives the network communications request and the check result of Step S602 is YES, the process proceeds to Step S604 in which the system controller 1 receives the modem command from the facsimile application manager 51 after sending a corresponding responsive signal back to the sending CL 203. Then, in Step S605, the system controller 1 draws and stores the information of the telephone number for the specific facsimile machine included in the modem command.

In Step S606, the system controller 1 arranges to perform the predetermined pre-transmission preparation process of the Group 3 facsimile communications procedure. During this pre-transmission preparation process, the system control 1 receives and stores further information from the sending CL 203, which include the properties of the transmitting image information, such as image density, encoding method, data size, and the image information, and also of the CL 203 itself, such as its own identification information.

Then, in Step S607, the system controller 1 performs the facsimile modem operation. During the facsimile modem operation, the system control 1 receives the image information via the LAN 102 and stores the received image information in the system memory 2. In Step S608, the system controller 1 conducts to perform the predetermined post-transmission preparation process of the Group 3 facsimile communications procedure upon a completion of receiving the image information.

In Step S609, the system controller 1 receives a network-disconnect instruction after the post-transmission preparation process, and disconnects the network connection with the sending CL 203. Upon the disconnection of the network connection with the sending CL 203, the system controller 1 calls, in Step S611, the destination facsimile machine connected to the PSTN 120 using the telephone number and sends the image information, both of which are stored in the system memory 2, to the destination facsimile machine.

Figure 16:
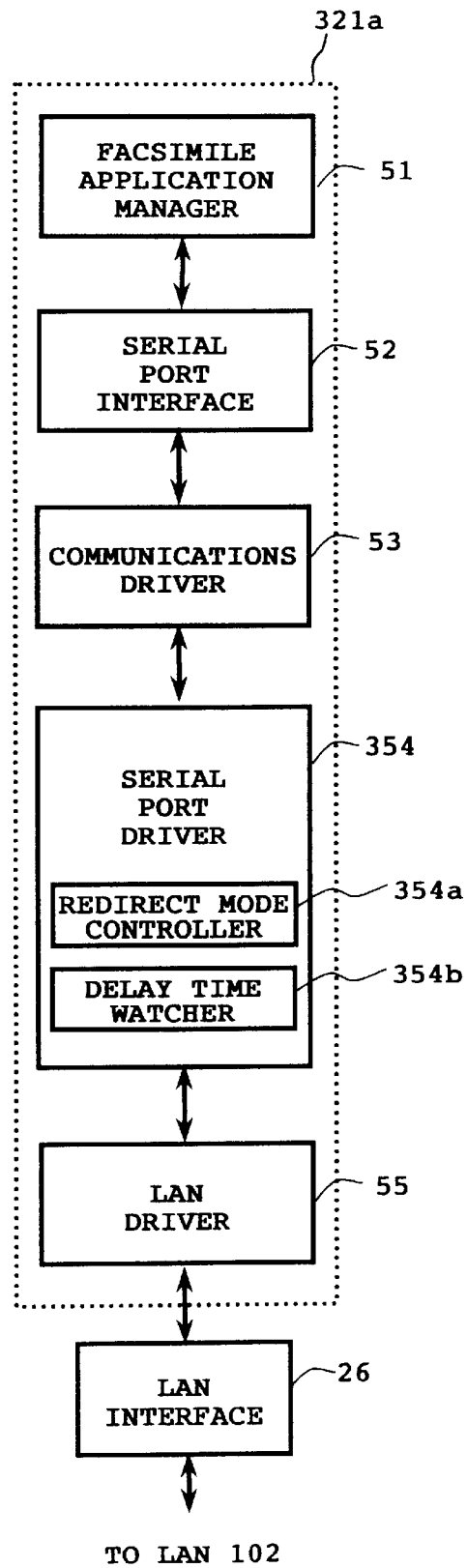
FIG. 16 is a block diagram of a main part of a third exemplary central processing unit.

Next, a third embodiment of the facsimile application controller is explained with reference to FIGS. 16–21. A third embodiment of the facsimile application controller is referred to as a facsimile application controller 321a. As demonstrated in FIG. 16, the facsimile application controller 321a is similar to the facsimile application controller 21a of FIG. 5, except for the configuration of the serial port driver. The serial port driver of the facsimile application controller 321a is provided with a reference numeral 354, as shown in FIG. 16. The serial port driver 354 of the facsimile application controller 321a includes a redirect mode controller 354a that switches the communications between the facsimile application manager 51 and the network facsimile apparatus 100 between indirect and direct modes. The serial port driver 354 also includes a delay time watcher 354b that measures a time period from sending a test command sent from the client terminal to receiving a responsive signal corresponding to the test command. The time period measured by the delay time watcher 354b is referred to as a delay time $T_d$.

Accordingly, in the following description, a CPU (central processing unit) which includes the facsimile operation controller 321a in place of the facsimile operation controller 21a is referred to as a CPU 321 (not shown), and a client terminal which includes such a CPU 321 in place of the CPU 21 is referred to as a CL 303 (not shown).

Figure 17:
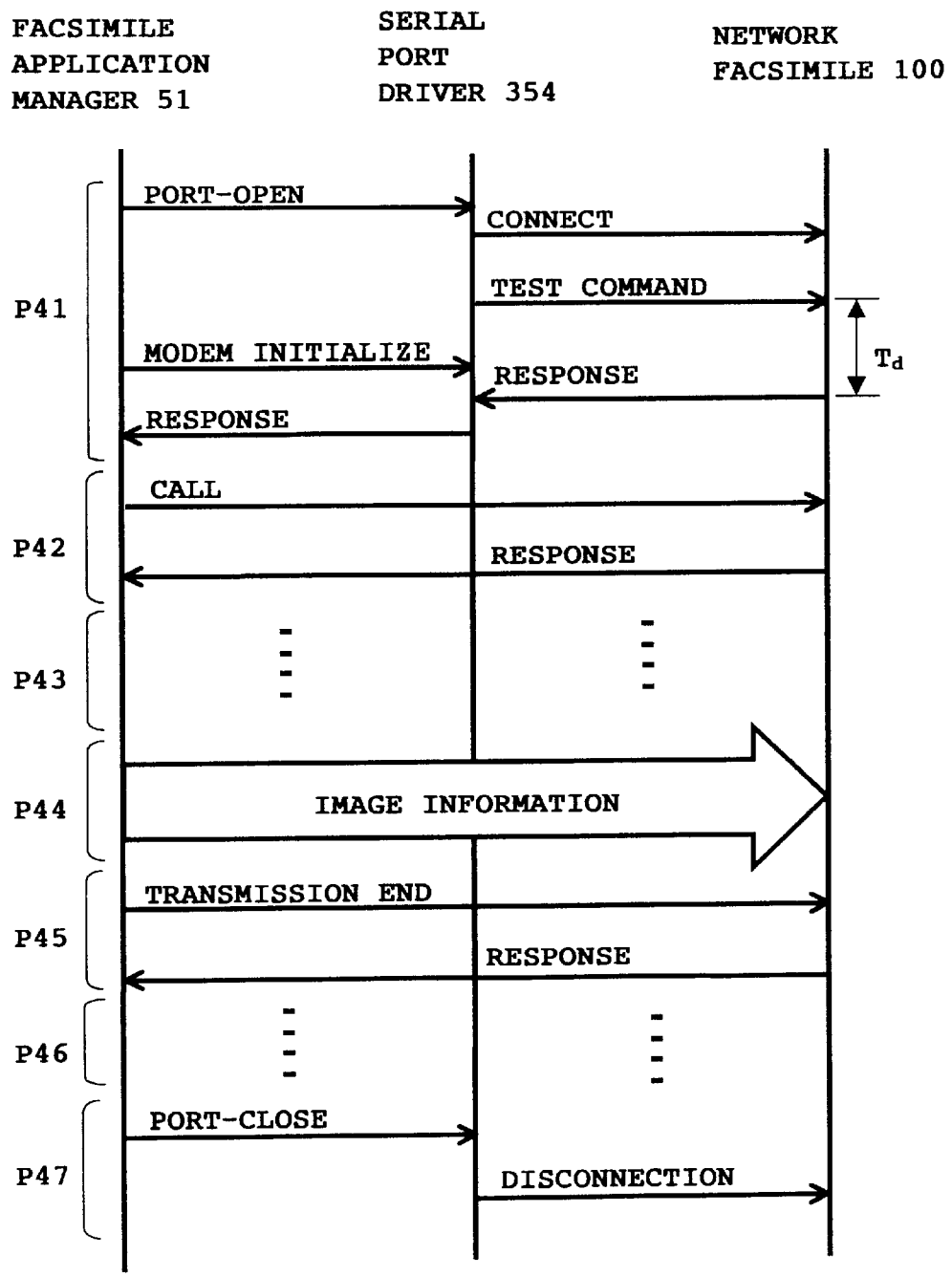
FIG. 17 is a diagram explaining an exemplary procedure of the facsimile communications operation by the third exemplary central processing unit of FIG. 16, when a delay time is smaller than a predetermined value.

An exemplary facsimile transmission operation of the facsimile application controller 321a for instances when one of the CLs 303 sends image information to the network facsimile apparatus 100 is represented in FIG. 17. As shown in FIG. 17, the facsimile transmission operation is split into a plurality of sequential Processes P41–P47, which partly correspond to the standardized sequential phases A–E of the Group 3 facsimile communications procedure.

This facsimile transmission operation starts with Process P41 as a start-up process before entering into the standardized sequential phases A–E of the Group 3 facsimile communications procedure. In Process P41, the facsimile application manager 51 of the CL 303 gives the serial port driver 354 start-up instructions including the port-open instruction for activating the serial port and the modem command for initializing the facsimile modem functions. In responding to the start-up instructions given, the serial port driver 354 opens the serial port and sends the request for communications to the network facsimile apparatus 100 via the LAN 102. Upon receiving the acceptance signal from the network facsimile apparatus 100, the serial port driver 354 sends a predetermined test command to the network facsimile apparatus 100. Then, the network facsimile apparatus 100 receives the test command and sends a responsive signal corresponding to the test command back to the serial port driver 354.

The delay time watcher 354b of the serial port driver 354 measures the delay time $T_d$ from sending the test command to the network facsimile apparatus 100 until receiving the responsive signal from the network facsimile apparatus 100. Further, the serial port driver 354 determines whether the measured delay time $T_d$ measured by the delay time watcher 354b is within a predetermined allowable delay time X. If the delay time $T_d$ is within the predetermined allowable delay time X, the serial port driver 354 sends a corresponding responsive signal back to the facsimile application manager 51. At the same time, the redirect mode controller 354a of the serial port driver 354 sets the redirect mode where the facsimile application manager 51 and the network facsimile apparatus 100 can communicate directly.

In Process P42, which corresponds to the phase A of the Group 3 facsimile communications procedure, the facsimile application manager 51 sends the modem command for requesting a transfer call to the specific facsimile machine connected to the PSTN 120 to the network facsimile apparatus 100. As this 10 modem command includes the telephone number of the specific destination facsimile machine (e.g., the FAX 121), the network facsimile apparatus 100 stores the telephone number upon receiving the modem command. Then, the network facsimile apparatus 100 sends the corresponding responsive signal directly back to the facsimile application manager 51.

In Process P43, which corresponds to the phase B of the Group 3 communications procedure, the facsimile application manager 51 and the network facsimile apparatus 100 perform the predetermined pre-transmission preparation process of the Group 3 facsimile communications procedure. Specifically, the facsimile application manager 51 sends various kinds of information to the network facsimile apparatus 100 during the pre-transmission procedure, including the properties of transmitting information, such as image density, encoding method, data size, and so forth, and of the CL 303 itself, such as its own identification information. The network facsimile apparatus 100 accordingly stores the received information.

In Process P44, which corresponds to the phase C of the Group 3 facsimile communications procedure, the facsimile application manager 51 sends the transmitting image information straight to the network facsimile apparatus 100. The network facsimile apparatus 100 stores the image information upon its receipt. The redirect mode will be continued until the facsimile application manager 51 completes the transmission of image information.

In Process P45, corresponding to the phase D of the Group 3 facsimile communications procedure, the facsimile applications manager 51 sends to the network facsimile apparatus 100 the modem command indicating that the transmission of image information is completed, and the network facsimile apparatus 100 responds to the received modem command by sending the corresponding responsive signal back to the facsimile application manager 51. Subsequently, in Process P46, corresponding to the phase E of the Group 3 facsimile communications procedure, the facsimile application manager 51 and the network facsimile apparatus 100 perform a predetermined post-transmission preparation process of the Group 3 facsimile communications procedure.

In Process P47, after a completion of the predetermined post-transmission preparation, the facsimile application manager 51 sends the port-close instruction to the serial port driver 354. Consequently, the serial port driver 354 ends the communications with the facsimile application manager 51 and disconnects the network connection with the network facsimile apparatus 100.

In this way, the network facsimile apparatus 100 can receive and store the necessary information for transferring image information. The network facsimile apparatus 100 can later initiate a call to the destination facsimile machine (e.g., the FAX 121) using the stored telephone number so as to perform the facsimile transmission operation to transfer the stored image information to that destination facsimile machine (e.g., the FAX 121), based on the property information of the stored image information.

As described above, in the facsimile operation controller 321a of FIG. 16, the serial port driver 354 is configured to measure a delay time from a time of sending the test command to a time of receiving the responsive signal and to determine whether the measured delay time is smaller than the predetermined value X. With this delay time measuring feature to be performed in Process P41, the facsimile application manager 51 is helped to avoid causing a communications error due to the problematic delay time in communications, especially in Process P41, through the Group 3 facsimile communications procedure.

If the delay time measured during the above-described facsimile transmission operation is greater than the predetermined value X, the facsimile transmission operation by the CL 303 will become different from the operation demonstrated in FIG. 17.

Figure 18:
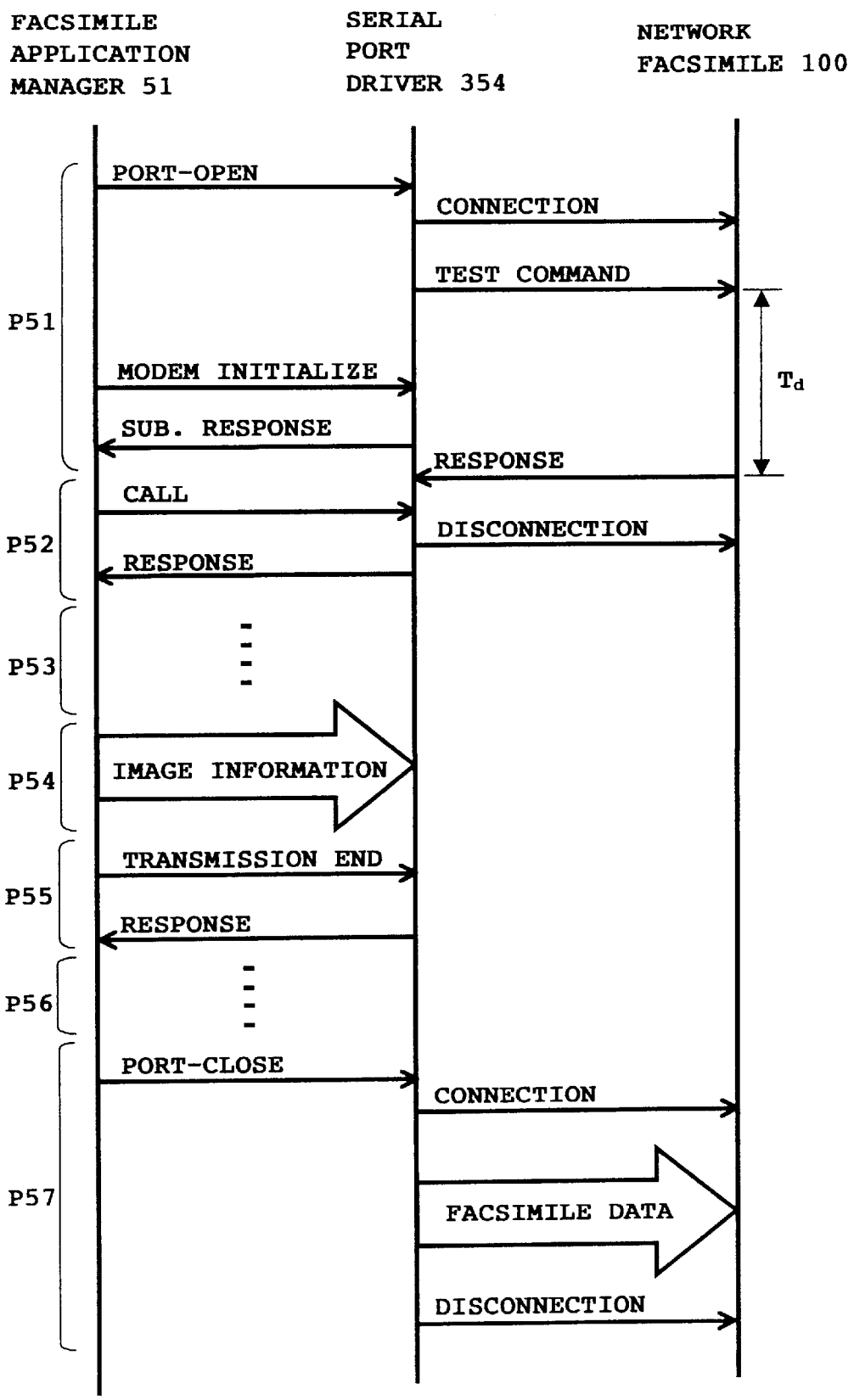
FIG. 18 is a diagram explaining an exemplary procedure of the facsimile communications operation by the third exemplary central processing unit of FIG. 16, when the delay time is greater than the predetermined value.

An exemplary facsimile transmission operation by the CL 303, for instances when the serial port driver 354 determines that the time delay Td is greater than X, is explained with reference to FIG. 18. The facsimile transmission operation of FIG. 18 is split into a plurality of sequential Processes P51–P57, which partly corresponds to the standardized sequential phases A–E of the Group 3 facsimile communications procedure.

This facsimile transmission operation starts with Process P51 as the start-up process before entering into the standardized sequential phases A–E of the Group 3 facsimile communications procedure. In Process P51, the facsimile application manager 51 of the CL 303 gives the serial port driver 354 start-up instructions including the port-open instruction for activating the serial port and the modem command for initializing the facsimile modem functions. In responding to the start-up instructions given, the serial port driver 354 opens the serial port and sends the request for communications to the network facsimile apparatus 100 via the LAN 102. Upon receiving the acceptance signal from the network facsimile apparatus 100, the serial port driver 354 sends the predetermined test command to the network facsimile apparatus 100. Then, the network facsimile apparatus 100 receives the predetermined test command and sends the responsive signal corresponding to the command back to the serial port driver 354.

The delay time watcher 354b of the serial port driver 354 measures the delay time $T_d$ from sending the predetermined test command to the network facsimile apparatus 100 until receiving the responsive signal from the network facsimile apparatus 100. Further, the serial port driver 354 determines if the measured delay time $T_d$ is within the predetermined allowable delay time X. In an event that the delay time $T_d$ exceeds the predetermined allowable delay time X, the serial port driver 354 sends a substitutionally responsive signal corresponding to the event back to the facsimile application manager 51, even before receiving the responsive signal from the network facsimile apparatus 100. At the same time, the serial port driver 354 sends the disconnection instruction to the network facsimile apparatus 100.

Then, in Processes P52–P56, which respectively correspond to the phases A–E of the Group 3 facsimile communications procedure, the serial port driver 354 performs the predetermined communications operations with the facsimile application manager 51 according to the Group 3 facsimile communications procedure, in the similar manner as described in Processes P12–16 of FIG. 6. Consequently, the serial port driver 354 stores the various kinds of information including a telephone number of a specific destination facsimile machine (e.g., the FAX 121), properties of the transmitting image information, such as image density, encoding method, data size, and so forth, and of the CL 303 itself, such as its own identification information.

In Process P57, the facsimile application manager 51 sends the port-close instruction to the serial port driver 354. Upon receiving the port-close instruction, the serial port driver 354 ends the communications with the facsimile application manager 51, and sends the request for communications to the network facsimile apparatus 100 via the LAN 102. Further, when the network facsimile apparatus 100 accepts the communications request and connects the line with the CL 303, the serial port driver 354 transmits a set of the information to the network facsimile apparatus 100 via the LAN 102. At this time, the set of the information includes the telephone number of the specific destination facsimile machine (e.g., the FAX 121), the various kinds of property information with respect to the image information, and the image information. After a completion of the information transmission, the serial port driver 354 sends the line disconnection instruction to the network facsimile apparatus 100.

In this way, the CL 303 performs the facsimile transmission operation so that the information necessary for sending image information to a specific facsimile machine connected to the PSTN 120 are properly transmitted to the network facsimile apparatus 100 without causing a communications error, even if the delay time $t_d$ is greater than the predetermined allowable delay time X. After that, the network facsimile apparatus 100 can initiate a call to the destination facsimile machine (e.g., the FAX 121) using the telephone number thereof. The network facsimile apparatus 100 can then transfer the image information, which is reformed based on the property information with respect to the image information, to the destination facsimile machine (e.g., the FAX 121). Thus, the transmission of image information from the CL 303 to an arbitrary facsimile machine connected to the PSTN 120 can be achieved, using the network facsimile apparatus 100.

As described above, in the third embodiment of the facsimile operation controller of the CL 303, the serial port driver 354 is configured to determine if the redirect mode can be used according to the measurement result of the delay time $T_d$, so that the facsimile application manager 51 can avoid a problematic time delay in the communications with the network facsimile apparatus 100 through the Group 3 facsimile communications procedure. Accordingly, the CL 303 can properly perform the facsimile transmission operation to the network facsimile apparatus 100 without an error caused due to the delay time.

Figure 19A:
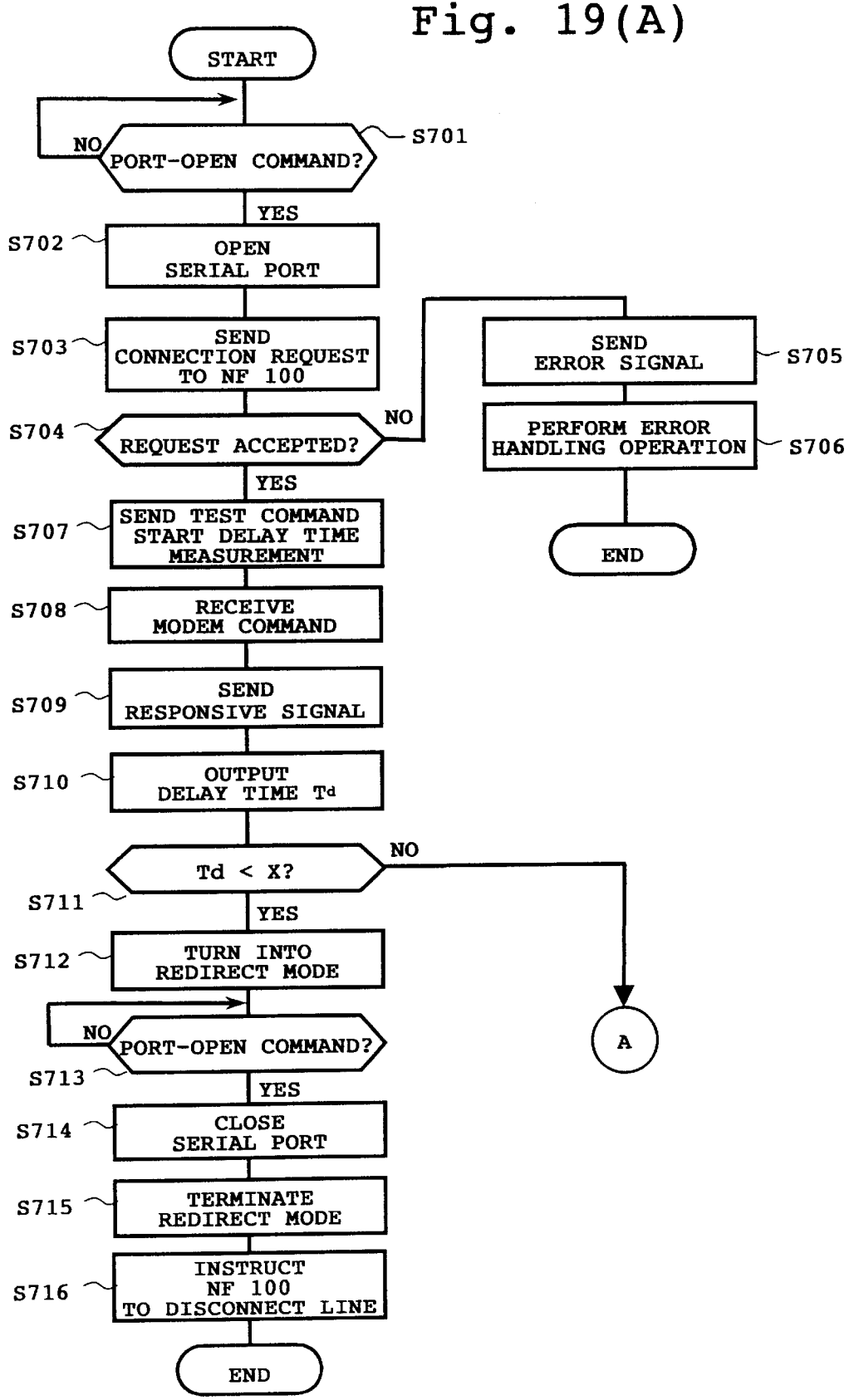
FIGS. 19(A) and 19(B) are flowcharts of an exemplary operation of the client terminal apparatus in accordance with the procedure of the facsimile communications operation of FIG. 18.
Figure 19B:
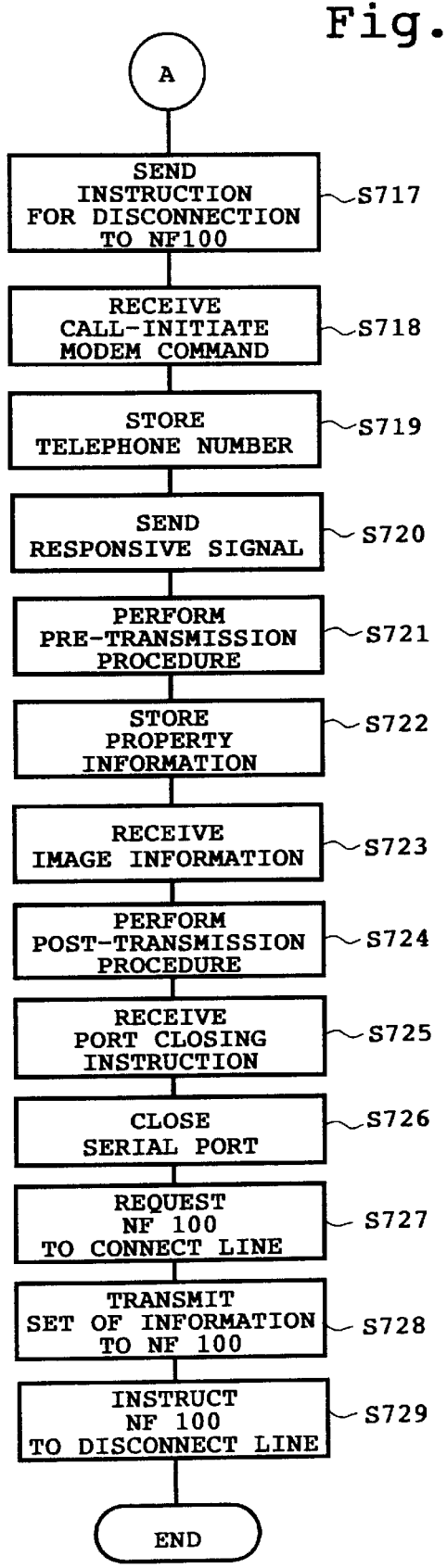

An exemplary procedure of the CL 303's operation during the above-described facsimile transmission operation of FIG. 18 is demonstrated in FIGS. 19(A) and 19(B). In Step S701 of FIG. 19(A), the serial port driver 354 continuously checks if the port-open instruction from the facsimile application manager 51 is detected. If the instruction is detected, the serial port driver 354 turns into the port-open mode in Step S702. Then, in Step S703, the serial port driver 354 sends the request for establishing a line connection to the network facsimile apparatus 100, via the LAN interface 26 of the LC 303 and the LAN 102, in order to request a transmission of image information to the specific facsimile machine having that telephone number.

In Step S704, the serial port driver 354 checks if the network facsimile apparatus 100 returns the acceptance signal in response to the request. If no acceptance signal from the network facsimile apparatus 100 is detected in Step S704, the serial port driver 354 sends an error signal to the facsimile application manager 51 in Step S705. In this case, the serial port driver 354 performs an error handling operation in Step S706, and the process ends.

If the acceptance signal from the network facsimile apparatus 100 is detected in Step S704, the serial port driver 354 sends the test command and starts to measure the delay time $T_d$, in Step S707. Then, the serial port driver 354 receives the modem command for initializing the modem from the facsimile application manager 51 in Step S708, and sends the substitutionally responsive signal corresponding to the modem command back to the facsimile application manager 51 in Step S709.

Then, the serial port driver 354 reads the measured delay time $T_d$ in Step S710, and determines if the delay time $_dT$ is smaller than the predetermined allowable delay time X in Step S711. If the delay time $T_d$ is smaller than the predetermined allowable delay time X and the determination result of Step S711 is YES, the process proceeds to Step S712 in which the redirect mode controller 354a of the serial port driver 354 establishes the redirect mode between the facsimile application manager 51 and the network facsimile apparatus 100. Under the redirect mode, the facsimile application manager 51 directly sends the aforementioned set of information to the network facsimile apparatus 100.

Then, in Step S713, the serial port driver 354 turns into the wait mode waiting for the port-close instruction from the facsimile application manager 51. Only when the port-close instruction is detected by the serial port driver 354 in Step S713, the process proceeds to Step S714 where the serial port driver 354 closes the port. Then, in Step S715, the serial port driver 354 sends the network disconnection instruction to the network facsimile apparatus 100. The process then ends.

If the delay time $T_d$ is greater than the predetermined allowable delay time X and the determination result of Step S711 is NO, the process proceeds to Step S717 of FIG. 19(B) in which the serial port driver 354 sends the network disconnection instruction to the network facsimile apparatus 100. In Step S718, the serial port driver 354 receives the modem command for requesting a transfer call to the specific facsimile machine connected to the PSTN 120. The serial port driver 354 then draws the telephone number of that specific facsimile machine from the received modem command and stores the telephone number in Step S719, and subsequently sends the responsive signal corresponding to the modem command back to the facsimile application manager 51 in Step S720.

In Step S721, the serial port driver 354 performs the predetermined pre-transmission procedure of the Group 3 facsimile communications procedure with the facsimile application manager 51. In Step S722, the serial port driver 354 stores the various kinds of information which are included in the signals sent from the facsimile application manager 51 during the above-mentioned pre-transmission procedure. The information includes the properties of transmitting image information, such as image density, encoding method, data size, and so forth, and of the CL 303 itself, such as its own identification information.

In Step S723, the serial port driver 354 receives and stores image information transmitted from the facsimile application manager 51. In Step S724, after a completion of image information transmission, the serial port driver 354 performs the predetermined post-transmission procedure of the Group 3 communication procedure with the facsimile application manager 51. Then, the serial port driver 354 receives the instruction for closing the port in Step S725 and responds to the instruction by turning the mode into the closed-port mode in Step S726.

In Step S727, the serial port driver 354 sends the request for establishing a line connection to the network facsimile apparatus 100 via the LAN 102. In Step S728, if the network facsimile apparatus 100 accepts the request and connects the line, the serial port driver 354 transmits the set of information to the network facsimile apparatus 100 via the LAN 102. The set of information includes the telephone number of the specific facsimile machine connected to the PSTN 120, the properties of transmitting image information such as an image density, an encoding method, a data size, and the image information. Finally, in Step S729, upon completing the information transmission performed in Step S728, the serial port driver 354 sends the instruction for disconnecting the network communications to the network facsimile apparatus 100.

FIG. 20 explains an outline of an exemplary operation of the delay time measurement which is performed in Step S707 of FIG. 19(A). The delay time watcher 354b of the serial port driver 354 includes a timer (not shown) for the delay time measurement operation. When the serial port driver 354 receives the modem command from the facsimile application manager 51, the delay time watcher 354b starts the timer in Step S801 of FIG. 20. In Step S802, the serial port driver 354 turns into the wait mode waiting for the responsive signal from the network facsimile apparatus 100 via the LAN 102. Only when the serial port driver 354 receives the responsive signal from the network facsimile apparatus 100, the delay time watcher 354b stops the timer in Step S803. Then, in Step S804, the delay time watcher 354b outputs the time period from start to stop of the timer as the delay time $T_d$. Then, the delay time $T_d$ is compared with the value X by the serial port driver 354. In this way, the serial port driver 354 determines if the delay time is smaller than the value X.

Figure 21:
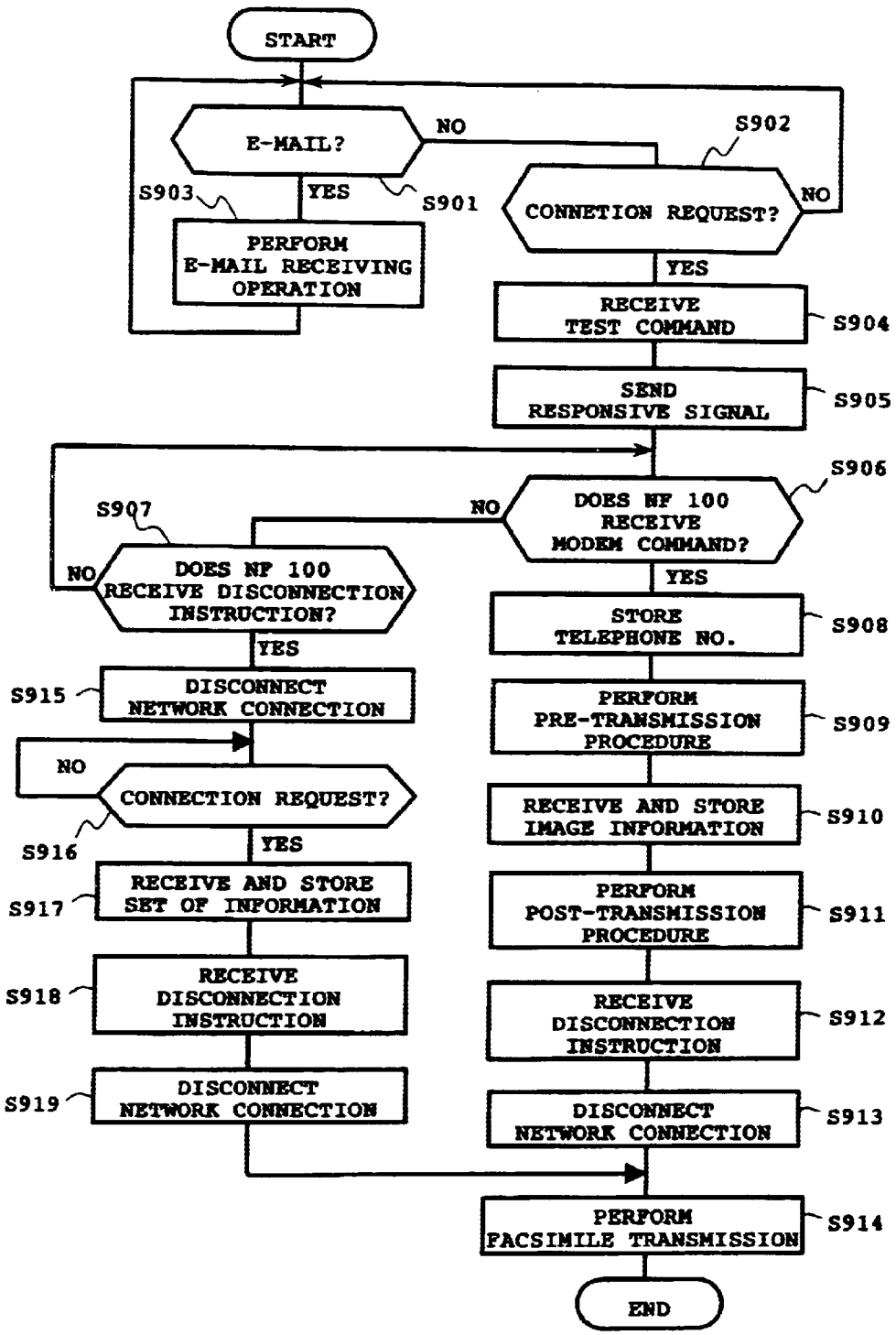
FIG. 21 is a flowchart of an exemplary operation of the network facsimile apparatus in accordance with the procedure of the facsimile communications operation of FIG. 18.

FIG. 21 explains an exemplary procedure of the network facsimile apparatus 100's operation during the third exemplary facsimile transmission operation of FIG. 18. In the network facsimile apparatus 100, the system controller 1 keeps constant watch on an incoming signal from outside and checks if it is an electronic mail in Step S901 and if it is the request for the network communications in Step S902, as shown in FIG. 21. If the check result of Step S901 is YES, meaning that the network facsimile apparatus 100 receives an electronic mail, the system controller 1 performs the predetermined operation for receiving electronic mail in Step S903, and the process returns to Step S901. If the check result of Step S901 is NO, meaning that the network facsimile apparatus 100 receives no electronic mail, the process proceeds to Step S902 where if the network facsimile apparatus 100 receives the network communications request is monitored.

If the network facsimile apparatus 100 receives no network communications request and the check result of Step S902 is NO, the process returns to Step S901. If the network facsimile apparatus 100 receives the network communications request and the check result of Step S902 is YES, the process proceeds to Step S904 and the system controller 1 arranges to send a corresponding responsive signal back to the sending CL 103. Then, the system controller 1 receives the test command from the CL 303 in Step S904, and sends the responsive signal corresponding to the test command back to the CL 303 in Step S905.

Then, the system controller 1 checks if the modem command for requesting a transfer call to the specific facsimile machine connected to the PSTN 120 is transmitted from the CL 303, in Step S906, and if the disconnection instruction is transmitted from the CL 303, in Step S907. If the modem command is transmitted from the CL 303 and the check result of Step S906 is YES, the process proceeds to Step S908 in which the system controller 1 draws and stores the information of the telephone number for the specific facsimile machine included in the modem command.

In Step S909, the system controller 1 arranges to perform the predetermined pre-transmission preparation process of the Group 3 facsimile communications procedure. During this pre-transmission preparation process, the system control 1 receives and stores further information from the sending CL 303, which include the properties of the transmitting image information, such as image density, encoding method, data size, and the image information, and also of the CL 303 itself, such as its own identification information.

Then, in Step S910, the system controller 1 performs the facsimile modem operation. During the facsimile modem operation, the system control 1 receives the image information via the LAN 102 and stores the received image information in the system memory 2. In Step S911, the system controller 1 conducts to perform the predetermined post-transmission preparation process of the Group 3 facsimile communications procedure upon a completion of receiving the image information.

In Step S912, the system controller 1 receives the network-disconnect instruction after the post-transmission preparation process, and disconnects the network connection with the CL 303 in Step S913. Upon the disconnection of the network connection with the sending CL 303, the system controller 1 calls, in Step S914, the destination facsimile machine connected to the PSTN 120 using the stored telephone number and sends the stored image information to the destination facsimile machine.

If the system controller 1 receives the disconnection instruction from the CL 303 and the check result of Step S907 is YES, the process proceeds to Step S915 in which the system controller 1 disconnects the network communications connection with the CL 303. In Step S916, it is checked if the network facsimile apparatus 100 receives the request for the network communications from the CL 303. If the network facsimile apparatus 100 receives the network communications request and the check result of Step S916 is YES, the process proceeds to Step S917 and the system controller 1 arranges to send the responsive signal corresponding to the request back to the sending CL 303.

In Step S917, the system controller 1 receives a set of information from the CL 303 via the LAN 102, and stores the set of information into the system memory 2. The set of information includes the telephone number of the specific facsimile machine connected to the PSTN 120, the properties of transmitting image information such as an image density, an encoding method, a data size, and the image information. Then, the system controller 1 receives a network-disconnect instruction in Step S918 and disconnects the network communications connection with the sending CL 303 in Step S919. Upon a disconnection of the network connection with the sending CL 303, the system controller 1 performs a facsimile transmission operation, in Step S914, so as to call the destination facsimile machine connected to the PSTN 120 using the stored telephone number and sends the stored image information to the destination facsimile machine.

Figure 22:
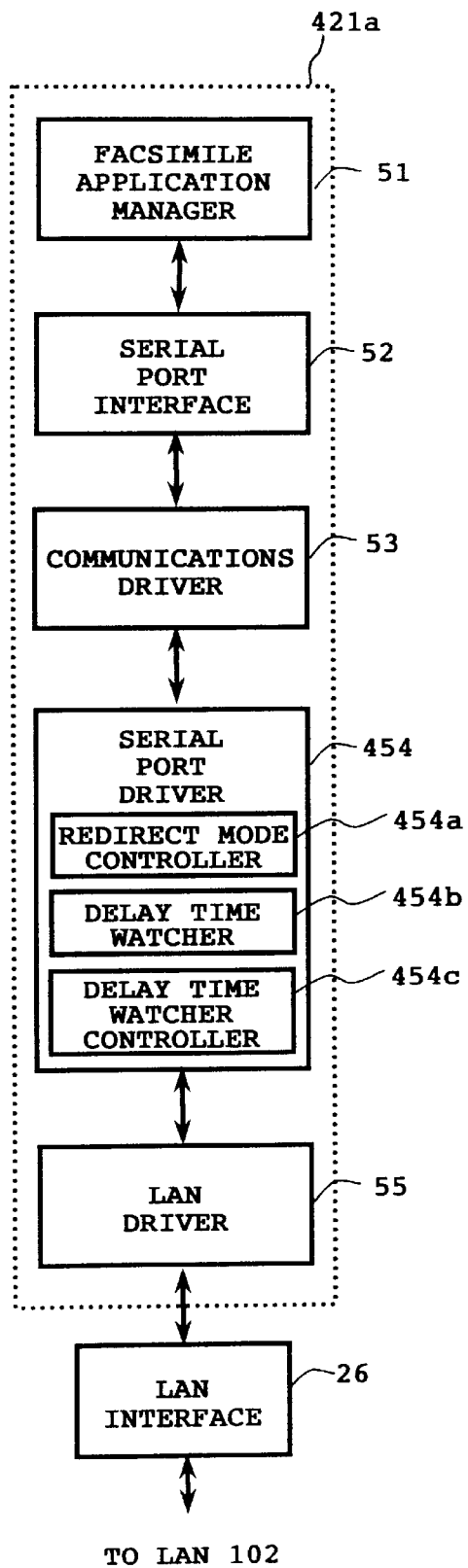
FIG. 22 is a block diagram of a main part of a fourth exemplary central processing unit.

Next, a fourth embodiment of the facsimile application controller is explained with reference to FIGS. 22–25. A fourth embodiment of the facsimile application controller is referred to as a facsimile application controller 421a. As shown in FIG. 22, the facsimile application controller 421a is similar to the facsimile application controller 21a of FIG. 5, except for the configuration of the serial port driver. The serial port driver of the facsimile application controller 421a is provided with a reference numeral 454, as shown in FIG. 22. The serial port driver 454 of the facsimile application controller 421a includes a redirect mode controller 454a that switches the communications between the facsimile application manager 51 and the network facsimile apparatus 100 between indirect and direct modes. The serial port driver 454 also includes a delay time watcher 454b that measures a time period from sending a test command sent from the client terminal to receiving a responsive signal corresponding to the test command. The time period measured by the delay time watcher 354b is referred to as a delay time $T_d$. The serial port driver 454 further includes a delay time watcher controller 454c that controls the delay time watcher 454b to perform the delay time measurement more than one time in one facsimile transmission operation by the facsimile application manager 421a of the CL 403.

Accordingly, in the following description, a CPU (central processing unit) which includes the facsimile operation controller 421a in place of the facsimile operation controller 21a is referred to as a CPU 421 (not shown), and a client terminal which includes such a CPU 421 in place of the CPU 21 is referred to as a CL 403 (not shown).

Since the communications between two data terminals is not always performable in a stable manner, the communications tend to cause a delay time which generally varies from time to time. Therefore, it is preferred to check if the delay time is within a desired value at a plurality of different time points. In the example being explained below, the delay time watch manager 454c controls the delay time watcher 454b to operate twice, for example, in the facsimile transmission operation between the CL 403 and the network facsimile apparatus 100; when the network facsimile apparatus 100 receives the modem command for initializing the modem and when the network facsimile apparatus 100 receives the modem command for requesting a transfer call to a specific facsimile machine connected to the PSTN 120.

Figure 23:
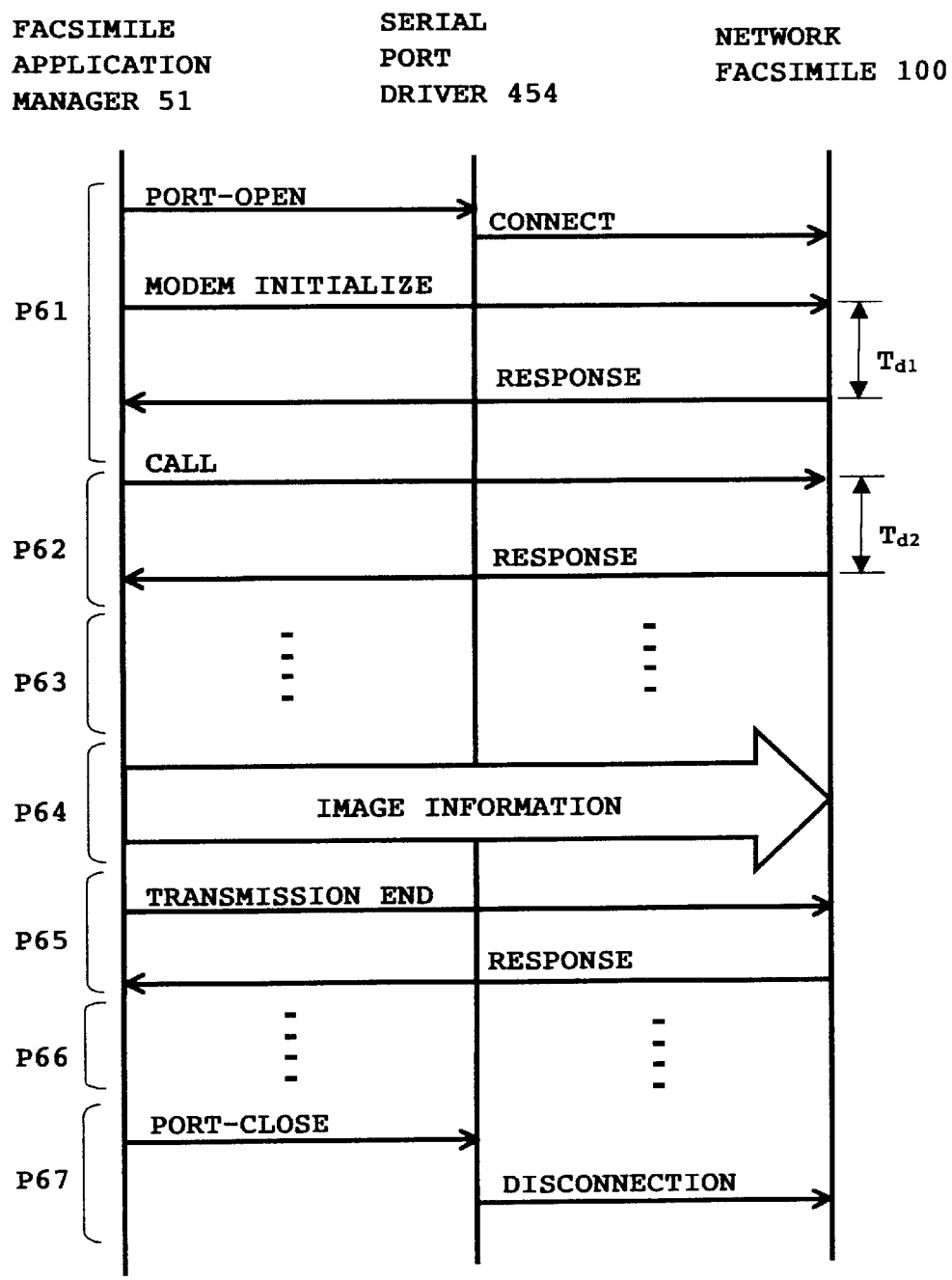
FIG. 23 is a diagram explaining an exemplary procedure of the facsimile communications operation by the fourth exemplary central processing unit of FIG. 22, when delay times are smaller than the predetermined value.

An exemplary facsimile transmission operation of the facsimile application controller 421a for instances when one of the CLs 403 sends image information to the network facsimile apparatus 100 is represented in FIG. 23. As shown in FIG. 23, the facsimile transmission operation is split into a plurality of sequential Processes P61–P67, which partly corresponds to the standardized sequential phases A–E of the Group 3 facsimile communications procedure.

The facsimile transmission operation of FIG. 23 is similar to that of FIG. 17, except for the operation in the first two Processes. The facsimile transmission operation of FIG. 23 starts with Process P61 as a start-up process before entering into the standardized sequential phases A–E of the Group 3 facsimile communications procedure. In Process P61, the facsimile application manager 51 of the CL 403 gives the serial port driver 454 start-up instructions including the port-open instruction for activating the serial port and the modem command for initializing the facsimile modem functions. In responding to the start-up instructions given, the serial port driver 454 opens the serial port and sends the request for communications to the network facsimile apparatus 100 via the LAN 102. Upon receiving the acceptance signal from the network facsimile apparatus 100, the serial port driver 454 establishes the redirect mode, so that the facsimile application manager 51 sends the modem command for initializing the modem straight to the network facsimile apparatus 100 under the redirect mode. At this time, the delay time watcher controller 454c controls the delay time watcher 454b to start the timer. Then, the network facsimile apparatus 100 receives the modem command and sends the corresponding responsive signal back to the serial port driver 54. With the responsive signal from the network facsimile apparatus 100, the delay time watcher 454b stops the timer.

The delay time watcher 454b outputs a delay time $T_{d1}$. Then, the serial port driver 454 determines whether the measured delay time $T_{d1}$ is within the predetermined allowable delay time X. If the delay time $T_{d1}$ is within the predetermined allowable delay time X, the serial port driver 454 allows the further operation of the facsimile application manager 51.

In Process P62, the facsimile application manager 51 sends the modem command, for requesting a transfer call to the specific facsimile machine connected to the PSTN 120, straight to the network facsimile apparatus 100. As this modem command includes the telephone number of the specific destination facsimile machine (e.g., the FAX 121), the network facsimile apparatus 100 stores the telephone number upon receiving the modem command. At the same time when the facsimile application manager 51sends the modem command to the network facsimile apparatus 100, the delay time watcher controller 454c controls the delay time watcher 454b to start the timer. Then, the network facsimile apparatus 100 receives the modem command and sends the corresponding responsive signal back to the serial port driver 454. With the responsive signal from the network facsimile apparatus 100, the delay time watcher 454b stops the timer. Then, the network facsimile apparatus 100 sends the corresponding responsive signal directly back to the facsimile application manager 51.

The delay time watcher 454b outputs a delay time $T_{d2}$. Then, the serial port driver 454 determines whether the measured delay time $T_{d2}$ is within the predetermined allowable delay time X. If the delay time $T_{d2}$ is within the predetermined allowable delay time X, the serial port driver 454 allows the further operation of the facsimile application manager 51.

Further operations in Processes P63–P67 are similar to those described above referring to Processes P43–P47 in FIG. 17.

In this way, the network facsimile apparatus 100 can receive and store the necessary information for transferring image information. The network facsimile apparatus 100 may later initiate a call to the destination facsimile machine (e.g., the FAX 121) using the telephone number provided so as to perform the facsimile transmission operation to transfer the provided image information, which is reformed based on the provided property information with respect to the image information, to the destination facsimile machine (e.g., the FAX 121).

As described above, in the facsimile operation controller 421a of FIG. 22, the serial port driver 454 is configured to measure a delay time in Processes P61 and P62 and to determine whether the measured delay times are smaller than the predetermined value X. With this delay time measuring feature to be performed in Processes P61 and P62, the facsimile application manager 51 is helped to avoid causing a communications error due to the problematic delay time in communications, especially in Processes P61 and P62, through the Group 3 facsimile communications procedure.

If one of the delay times measured during the above-described facsimile transmission operation is greater than the predetermined value X, the facsimile transmission operation by the CL 403 will become different from the operation demonstrated in FIG. 23.

An exemplary facsimile transmission operation by the CL 403, for instances when the serial port driver 454 determines that the time delay $T_{d2}$ is greater than X, is explained with reference to FIG. 24. The facsimile transmission operation of FIG. 24 is split into a plurality of sequential Processes P71–P77, which partly corresponds to the standardized sequential phases A–E of the Group 3 facsimile communications procedure.

Figure 24:
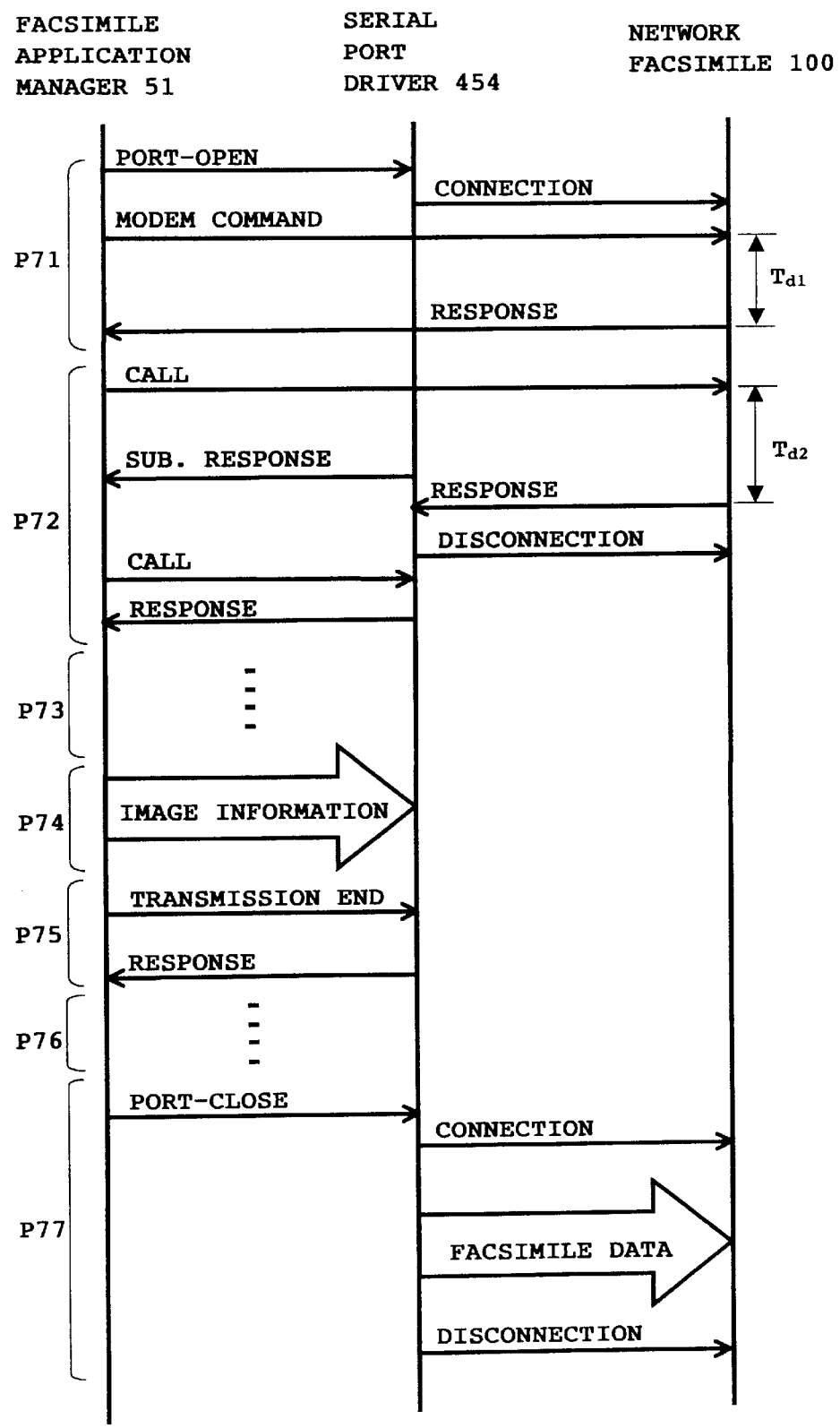
FIG. 24 is a diagram explaining an exemplary procedure of the facsimile communications operation by the fourth exemplary central processing unit of FIG. 22, when one of the delay times is greater than the predetermined value.

The facsimile transmission operation of FIG. 24 is similar to that of FIG. 18, except for the operation in the first two Processes. The facsimile transmission operation of FIG. 24 starts with Process P71 as a start-up process before entering into the standardized sequential phases A–E of the Group 3 facsimile communications procedure. In Process P71, the facsimile application manager 51 of the CL 403 gives the serial port driver 454 start-up instructions including the port-open instruction for activating the serial port and the modem command for initializing the facsimile modem functions. In responding to the start-up instructions given, the serial port driver 454 opens the serial port and sends the request for communications to the network facsimile apparatus 100 via the LAN 102. Upon receiving the acceptance signal from the network facsimile apparatus 100, the serial port driver 454 establishes the redirect mode, so that the facsimile application manager 51 sends the modem command for initializing the modem straight to the network facsimile apparatus 100 under the redirect mode. At this time, the delay time watcher controller 454c controls the delay time watcher 454b to start the timer. Then, the network facsimile apparatus 100 receives the modem command and sends the corresponding responsive signal back to the serial port driver 454. With the responsive signal from the network facsimile apparatus 100, the delay time watcher 454b stops the timer.

The delay time watcher 454b outputs the delay time $T_{d1}$. Then, the serial port driver 454 determines whether the measured delay time $T_{d1}$ is within the predetermined allowable delay time X. If the delay time $T_{d1}$ is within the predetermined allowable delay time X, the serial port driver 454 allows the further operation of the facsimile application manager 51.

In Process P72, upon receiving the responsive signal from the network facsimile apparatus 100, the facsimile application manager 51 sends the modem command for requesting a transfer call straight to the network facsimile apparatus 100 under the redirect mode. At this time, the delay time watcher controller 454c controls the delay time watcher 454b to start the timer. Then, the network facsimile apparatus 100 receives the modem command and sends the corresponding responsive signal back to the serial port driver 454. With the responsive signal from the network facsimile apparatus 100, the delay time watcher 454b stops the timer.

The delay time watcher 454b outputs the delay time $T_{d2}$. Then, the serial port driver 454 determines whether the measured delay time $T_{d2}$ is within the predetermined allowable delay time X. If the delay time $T_{d2}$ is within the predetermined allowable delay time X, the serial port driver 454 allows the further operation of the facsimile application manager 51. However, in this example being explained, the delay time $T_{d2}$ is determined as greater than the value X.

In this case, the serial port driver 454 sends a substitutionally responsive signal corresponding to the modem command to the facsimile application manager 51, as the responsive signal from the network facsimile apparatus 100 is delayed. Then, the serial port driver 454 sends the network disconnection instruction to the network facsimile apparatus 100. In response to the instruction from the serial port driver 454, the network facsimile apparatus 100 disconnects the communications line. Then, the facsimile application manager 51 sends the modem command for requesting a transfer call to the serial port driver 454. The serial port driver 454 responds to the facsimile application manager 51 by sending the responsive signal back to the facsimile application manager 51.

Further operations of Processes P73–P77 are similar to those described above referring to Processes P53–P57 in FIG. 18.

Thus, the CL 403 performs the facsimile transmission operation so that the information necessary for sending image information to a specific facsimile machine connected to the PSTN 120 are properly transmitted to the network facsimile apparatus 100, even if the delay time $t_d$ is greater than the predetermined allowable delay time X. Using the telephone number provided, the network facsimile apparatus 100 may initiate a call to the destination facsimile machine (e.g., the FAX 121). Then, the network facsimile apparatus 100 may transfer the image information, which is reformed based on the provided property information with respect to the image information, to the destination facsimile machine (e.g., the FAX 121). In this way, the transmission of image information from the CL 403 to an arbitrary facsimile machine connected to the PSTN 120 can be achieved, using the network facsimile apparatus 100.

Figure 25:
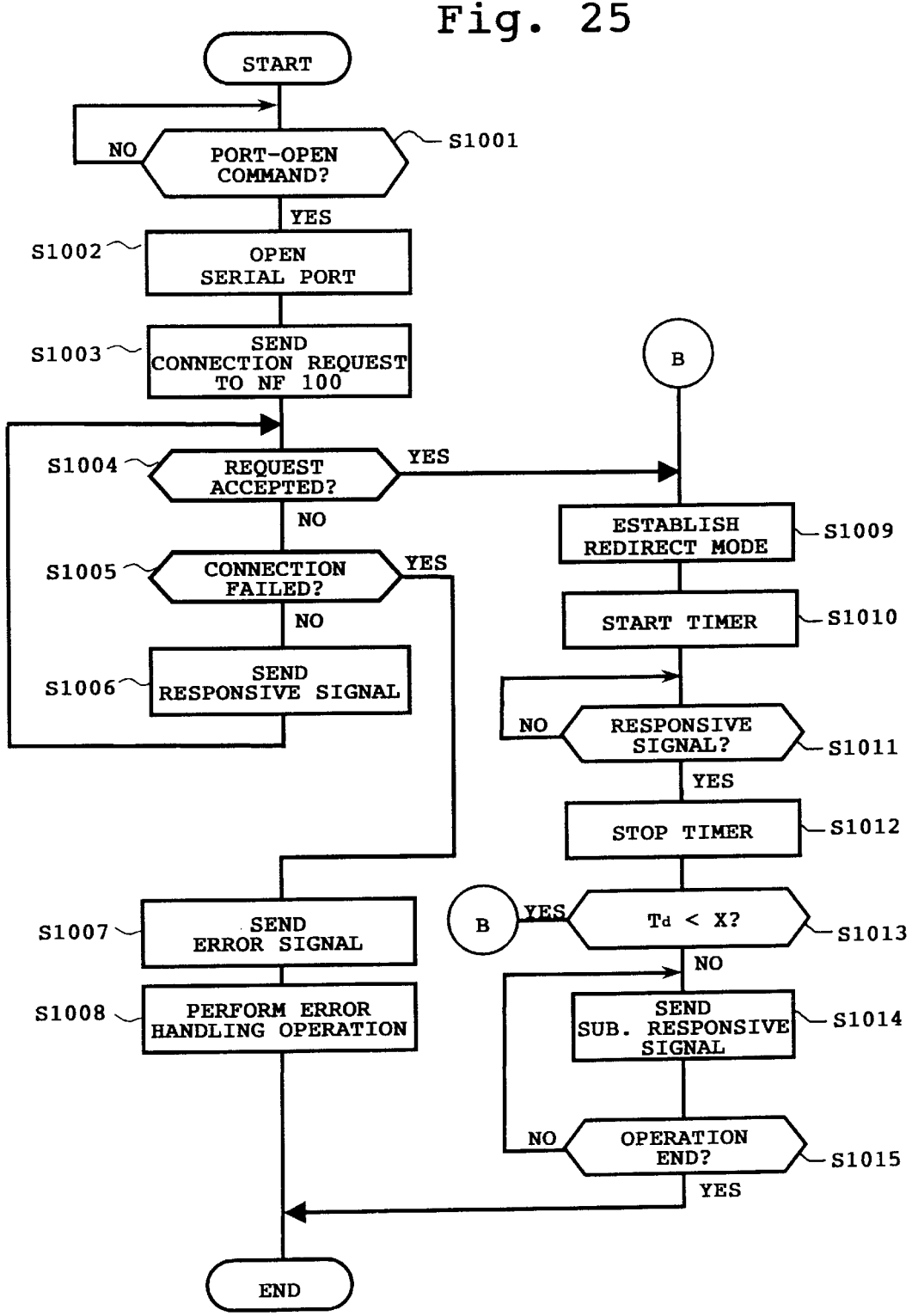
FIG. 25 is a flowchart of an exemplary operation of the client terminal apparatus in accordance with the procedure of the facsimile communications operation of FIG. 24.

FIG. 25 demonstrates an exemplary procedure of the CL 403's operation during the above-described fourth facsimile transmission operation. In Step S1001 of FIG. 25, the serial port driver 454 continuously checks if the port-open instruction from the facsimile application manager 51 is detected. If the instruction is detected, the serial port driver 454 turns into the port-open mode in Step S1002. Then, in Step S1003, the serial port driver 454 sends the request for establishing a line connection to the network facsimile apparatus 100, via the LAN interface 26 of the LC 403 and the LAN 102, in order to request a transmission of image information to the specific facsimile machine having that telephone number.

The serial port driver 454 checks, in Step S1004, if the network facsimile apparatus 100 returns the acceptance signal in response to the request and, in Step S1005, if the network facsimile apparatus 100 fails to connect. If no acceptance signal from the network facsimile apparatus 100 is detected in Step S1004 and if the network facsimile apparatus 100 fails to connect, the serial port driver 454 sends an error signal to the facsimile application manager 51 in Step S1007. Then, the serial port driver 454 performs the error handling operation in Step S1008, and the process ends.

If no acceptance signal from the network facsimile apparatus 100 is detected in Step S1004 and if the network facsimile apparatus 100 does not fail to connect, the process proceeds to Step S1006 and the serial port driver 454 sends the substitutionally responsive signal to the facsimile application manager 51 when receiving the modem command from the facsimile application manager 51. Then, the process returns to Step S1004.

If an acceptance signal from the network facsimile apparatus 100 is detected in Step S1004, the process proceeds to Step S1009. In Step S1009, the redirect mode controller 454a sets the redirect mode when the serial port driver 454 receives the modem command, so that the modem command is passed straight to the network facsimile apparatus 100. Then, in Step S1010, the delay time watcher controller 454c controls the delay time watcher 454b to start the timer. In Step S1011, the serial port driver 454 continuously checks if the network facsimile apparatus 100 returns the responsive signal. If the network facsimile apparatus 100 returns the responsive signal and the check result of Step S1011 is YES, the delay time watcher controller 454c controls the delay time watcher 454b to stop the timer, in Step S1012. Then, in Step S1013, the delay time watcher 454b outputs the delay time $T_{d1}$ and calculates if the delay time $T_{d1}$ is smaller than the predetermined value X.

If the delay time $T_{d1}$ is smaller than the predetermined value X and the check result of Step S1013, the process proceeds to Step S1009 so as to repeat the cycle of Steps S1009–S1013 in order to determine if the delay time $T_{d2}$ is smaller than the predetermined value X. If the delay time $T_{d1}$ is greater than the predetermined value X and the check result of Step S1013 is NO, the process proceeds to Step S1014. In Step S1014, the serial port driver 454 sends the substitutionally responsive signal to the facsimile application manager 51 when the serial port driver 454 receives the modem command from the facsimile application manager 51. In Step S1015, the serial port driver 454 continuously checks if the facsimile transmission operation is completed. If the facsimile transmission operation is not completed, the process returns to Step S1014. If the facsimile transmission operation is completed, the process ends.

The embodiment of the present application may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The present application may also be implemented by the preparation of application specific integrated circuits or by interconnecting an appropriate network of conventional component circuits, as will be readily apparent to those skilled in the art.

This application is based on Japanese Patent Application No. JPAP09-303363 filed Oct. 20, 1997, the entire contents of which are herein incorporated by reference.

Numerous additional modifications and variations of the present application are possible in light of the above teachings. It is therefore to be understood that within the scope of the appended claims, the present application may be practiced otherwise than as specifically described herein.

What is claimed is:

1. A client data terminal capable of being coupled to a local area network and capable of communicating via the local area network with a different data terminal which is also connected to a public switched telephone network, said client data terminal programmed to perform functions comprising:

a first facsimile communications function that performs a standard facsimile communications operation in response to an information transfer request requesting the client data terminal to transfer the information to the different data terminal via said local area network in order to transfer facsimile image information via said different data terminal to an arbitrary facsimile machine which is connected to the public switched telephone network; and a second facsimile communications function that performs said standard facsimile communications operation with said first facsimile communications function and receives information, including a telephone number of said arbitrary facsimile machine, image information to be transferred, property information of said image information, and identification information identifying said client data terminal, and capable of performing said standard facsimile communications operation using said information received from said first facsimile communications function with said different data terminal through said local area network.

2. The data terminal of claim 1, wherein said second facsimile communications function controls said standard facsimile communications operation with said first facsimile communications function to perform throughout a plurality of facsimile communications steps which are defined as phases A through to E in accordance with a Group 3 facsimile communications procedure.

3. The data terminal of claim 2, wherein said second facsimile communications function sets a redirect mode to perform at least one of said plurality of phases A through to E of said standard facsimile communications operation directly between said first communications function and said different data terminal.

4. The data terminal of claim 3, wherein said second facsimile communications function sets said redirect mode to perform phase C of said standard facsimile communications operation directly between said first communications function and said different data terminal.

5. The data terminal of claim 3, wherein said second facsimile communications function measures a delay time in the communications with said different data terminal by sending a test command to said different data terminal, determines if said delay time is smaller than a predetermined value, and performs said standard facsimile communications operation under said redirect mode between said first facsimile communications function and said different data terminal when said delay time is smaller than said predetermined value and performs said standard facsimile communications operation first with said first facsimile communications function and then with said different data terminal when said delay time is greater than said predetermined value.

6. The data terminal of claim 5, wherein said second facsimile communications function sets said redirect mode before said standard facsimile communications operation and measures said delay time relative to a plurality of modem commands which are sent from said first facsimile communications function to said different data terminal.

7. The client data terminal of claim 1, wherein the first facsimile communications function is performed in accordance with a facsimile application program stored in and being run by said client data terminal.

8. The client data terminal of claim 1, wherein the second facsimile communications function comprises a driver program.

9. The client data terminal of claim 8, wherein the driver program comprises a serial port driver.

10. The client data terminal of claim 8, wherein the driver program communicates with the different data terminal via a local area network driver.

11. A computer recording medium including computer executable code capable of being run on a data terminal, comprising:

code for performing a standard facsimile communications operation with a facsimile application program which is also running on the data terminal for receiving information from the facsimile application program, including a telephone number of an arbitrary facsimile machine, image information to be transferred, property information of said image information, and identification information identifying said data-terminal, and for performing said standard facsimile communications operation using said information received from said facsimile application program with a different data terminal through a local area network.

12. The computer recording medium of claim 11, further comprising code for controlling said standard facsimile communications operation with said facsimile application program to perform throughout a plurality of facsimile communications steps which are defined as phases A through to E in accordance with a Group 3 facsimile communications procedure.

13. The computer recording medium of claim 12, further comprising code for setting a redirect mode to perform at least one of said plurality of phases A through to E of said standard facsimile communications operation directly between said facsimile application program and said different data terminal.

14. The computer recording medium of claim 13, wherein said code for setting said redirect mode performs phase C of said standard facsimile communications operation directly between said facsimile application program and said different data terminal.

15. The computer recording medium of claim 13, further comprising code for measuring a delay time in the communications with said different data terminal by sending a test command to said different data terminal, code for determining if said delay time is smaller than a predetermined value, and code for performing said standard facsimile communications operation under said redirect mode between said facsimile application program and said different data terminal when said delay time is smaller than said predetermined value and for performing said standard facsimile communications operation first with said facsimile application program and then with said different data terminal when said delay time is greater than said predetermined value.

16. The computer recording medium of claim 15, wherein said code for setting sets said redirect mode before said standard facsimile communications operation and measures said delay time relative to a plurality of modem commands which are sent from said facsimile application program to said different data terminal.

17. A computer recording medium as recited in claim 11, wherein the facsimile application program is stored in said data terminal.

18. A computer recording medium as recited in claim 11, therein the code comprises a driver program.

19. A computer recording medium as recited in claim 18, wherein the driver program comprises a serial port driver.

20. A computer recording medium as recited in claim 18, wherein the driver program communicates with the different data terminal via a local area network driver.

21. A method for a client data terminal to send facsimile information to a different data terminal which is coupled to a local area network and to a public switched telephone network, said facsimile information being requested to be transferred to an arbitrary facsimile machine by said different data terminal, comprising:

first transmitting said facsimile information, including a telephone number of said arbitrary facsimile machine, image information to be transferred, property information of said image information, and identification information identifying said client data terminal, to a buffer location within said client data terminal in accordance with a standard facsimile communications; and second transmitting said facsimile information from said buffer location to said different data terminal in accordance with said standard facsimile communications operation through said local area network.

22. The method of claim 21, wherein said first and second transmitting steps respectively perform throughout a plurality of facsimile communications steps which are defined as phases A through to E in accordance with a Group 3 facsimile communications procedure.

23. The method of claim 22, wherein said first transmitting step includes a redirect mode setting step for performing at least one of said plurality of phases A through to E of said standard facsimile communications operation directly to said different data terminal without transmitting said facsimile information to said buffer location.

24. The method of claim 23, wherein said redirect mode setting step performs phase C of said standard facsimile communications operation directly to said different data terminal without transmitting said facsimile information to said buffer location.

25. The method of claim 21, further comprising steps of measuring a delay time in the communications with said different data terminal by sending a test command to said different data terminal, determining if said delay time is smaller than a predetermined value, and performing said standard facsimile communications operation under said redirect mode for transmitting said facsimile information directly to said different data terminal when said delay time is smaller than said predetermined value and performing said standard facsimile communications operation first to transmit said facsimile information to said buffer location and then to transmit said facsimile information from said buffer location to said different data terminal when said delay time is greater than said predetermined value.

26. The method of claim 25, wherein said redirect mode setting step sets said direct mode before a start of said standard facsimile communications operation and said measuring step measures said delay time relative to a plurality of modem commands which are sent from said data terminal to said different data terminal.

27. An electronic communications system, comprising:

a facsimile machine, capable of being coupled to a public switched telephone network upon which an arbitrary facsimile machine is connected and to a local area network; and a computer recording medium including computer executable code capable of being run on a client data terminal, said computer recording medium comprising code for performing a standard facsimile communications operation with a facsimile application which is also running on the same client data terminal as the computer executable code for receiving information from the facsimile application, including a telephone number of said arbitrary facsimile machine, image information to be transferred, property information of said image information, and identification information identifying said client data terminal, and code capable of performing said standard facsimile communications operation using said information received from said facsimile application with said facsimile machine through said local area network.

28. The electronic communications system of claim 27, wherein said computer executable code further comprises code for controlling said standard facsimile communications operation with said facsimile application to perform throughout a plurality of facsimile communications steps which are defined as phases A through to E in accordance with a Group 3 facsimile communications procedure.

29. The electronic communications system of claim 28, wherein said computer executable code further comprises code for setting a redirect mode to perform at least one of said plurality of phases A through to E of said standard facsimile communications operation directly between said facsimile application and said facsimile machine.

30. The electronic communications system of claim 29, wherein said computer executable code further comprises code for setting said redirect mode to perform said phase C of said standard facsimile communications operation directly between said facsimile application and said facsimile machine.

31. The electronic communications system of claim 27, wherein said computer executable code further comprises code for measuring a delay time in the communications with said facsimile machine by sending a test command to said facsimile machine, determines if said delay time is smaller than a predetermined value, and performs said standard facsimile communications operation under said redirect mode between said facsimile application and said facsimile machine when said delay time is smaller than said predetermined value and performs said standard facsimile communications operation with said facsimile application and with said facsimile machine when said delay time is greater than said predetermined value.

32. The electronic communications system of claim 31, wherein said computer executable code further comprises code for setting said redirect mode before said standard facsimile communications operation and measures said delay time relative to a plurality of modem commands which are sent from said facsimile application to said facsimile machine.

33. An electronic communication system as recited in claim 27, wherein the facsimile machine comprises a network facsimile machine.

34. An electronic communications system, comprising:

a plurality of client data terminals, each of which is coupled to a local area network;

a plurality of different data terminals, each of which is coupled to said local area network and to a public switched telephone network; and a plurality of facsimile terminals, each of which is coupled to said public switched telephone network, wherein each of said client data terminal means comprises computer executable code comprising:

facsimile application code for performing a standard facsimile communications operation with respect to an information transfer request to one of said different data terminal means through said local area network in order to transfer facsimile image information via said one of said different data terminal means to one of said facsimile terminals; and code for performing a standard facsimile communications operation with the facsimile application code which is running on the same client data terminal and for receiving information, including a telephone number of one of said facsimile machines, image information to be transferred, property information of said image information, and identification information identifying said client data terminal, and for performing said standard facsimile communications operation using said information received from said facsimile application code with said one of different data terminals through said local area network.

35. The electronic communications system of claim 34, wherein said computer executable code further comprises code for controlling said standard facsimile communications operation with said facsimile application code to perform throughout a plurality of facsimile communications steps which are defined as phases A through to E in accordance with a Group 3 facsimile communications procedure.

36. The electronic communications system of claim 35, wherein said computer executable code further comprises code for setting a redirect mode to perform at least one of said plurality of phases A through to E of said standard facsimile communications operation directly between said facsimile application code and said one of different data terminals.

37. The electronic communications system of claim 36, wherein said computer executable code further comprises code for setting said redirect mode to perform said phase C of said standard facsimile communications operation directly between said facsimile application code and said one of different data terminals.

38. The electronic communications system of claim 34, wherein said computer executable code further comprises code for measuring a delay time in the communications with said one of different data terminals by sending a test command to said one of different data terminals, determines if said delay time is smaller than a predetermined value, and performs said standard facsimile communications operation under said redirect mode between said facsimile application code and said one of different data terminals when said delay time is smaller than said predetermined value and performs said standard facsimile communications operation first with said facsimile application code and then with said one of different data terminals when said delay time is greater than said predetermined value.

39. The electronic communications system of claim 38, wherein said computer executable code further comprises code for setting said redirect mode before said standard facsimile communications operation and measures said delay time relative to a plurality of modem commands which are sent from said facsimile application code to said one of said different data terminals.

40. An electronic communication system as recited in claim 34, wherein the facsimile machine comprises a network facsimile machine.

41. A method for an electronic communications system to transmit facsimile information from a data terminal to a different data terminal via a local area network using a facsimile communications operation, said facsimile information being transferred to a facsimile machine from said different data terminal, said method comprising:

connecting a plurality of said data terminals to said local area network;

connecting a plurality of said different data terminals to said local area network and to a public switched telephone network; and connecting a plurality of said facsimile machines to said public switched telephone network, selecting one of said data terminals as a sending data terminal;

selecting one of said different data terminals as a relay terminal;

selecting one of said facsimile machines as a destination facsimile machine;

first transmitting said facsimile information, including a telephone number of said destination facsimile machine, image information to be transferred, property information of said image information, and identification information of said sending data terminal, to a buffer location within said sending data terminal in accordance with a standard facsimile communications operation;

second transmitting said facsimile information from said buffer location to said relay data terminal in accordance with said standard facsimile communications operation through said local area network;

third transmitting said facsimile information from said relay data terminal to said destination facsimile machine via said public switched telephone network under said standard facsimile communications operation.

42. The method of claim 41, wherein said first, second and third transmitting steps respectively perform throughout a plurality of facsimile communications steps which are defined as phases A through to E in accordance with a Group 3 facsimile communications procedure.

43. The method of claim 42, wherein during said first transmitting step includes a redirect mode setting step for performing at least one of said plurality of phases A through to E of said standard facsimile communications operation directly to said relay data terminal without transmitting said facsimile information to said buffer location.

44. The method of claim 43, wherein said redirect mode setting step performs said phase C of said standard facsimile communications operation directly to said relay data terminal without transmitting said facsimile information to said buffer location.

45. The method of claim 41, further comprising steps of measuring a delay time in the communications with said relay data terminal by sending a test command to said relay data terminal, determining if said delay time is smaller than a predetermined value, and performing said standard facsimile communications operation under said redirect mode for transmitting said facsimile information directly to said relay data terminal when said delay time is smaller than said predetermined value and performing said standard facsimile communications operation first to transmit said facsimile information to said buffer location and then to transmit said facsimile information from said buffer location to said relay data terminal when said delay time is greater than said predetermined value.

46. The method of claim 45, wherein said redirect mode setting step sets said direct mode before a start of said standard facsimile communications operation and said measuring step measures said delay time with relative to a plurality of modem commands which are sent from said sending data terminal to said relay data terminal.

47. A computer recording medium including computer executable code capable of being run on a data terminal, comprising:

code for transmitting facsimile information, including a telephone number of an arbitrary facsimile machine, image information to be transferred, property information of said image information, and identification information identifying the client terminal, to a storage location within the client terminal in accordance with a standard facsimile communications, and code for transmitting the facsimile information from said storage location within the client terminal to a different data terminal in accordance with the standard facsimile communications operation through a local area network.

* * * * *